(12) United States Patent
Yuhara et al.

(10) Patent No.: US 7,949,330 B2
(45) Date of Patent: May 24, 2011

(54) SYSTEM AND METHOD FOR PROVIDING WEATHER WARNINGS AND ALERTS

(75) Inventors: Hiromitsu Yuhara, Rancho Palos Verdes, CA (US); Masayuki Habaguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 651 days.

(21) Appl. No.: 11/510,299

(22) Filed: Aug. 25, 2006

(65) Prior Publication Data

US 2007/0049260 A1    Mar. 1, 2007

Related U.S. Application Data

(60) Provisional application No. 60/711,606, filed on Aug. 25, 2005, provisional application No. 60/739,622, filed on Nov. 23, 2005.

(51) Int. Cl.
*H04Q 7/22*    (2006.01)
(52) U.S. Cl. .................................. 455/414.3
(58) Field of Classification Search ............... 455/414.3
See application file for complete search history.

(56) References Cited

U.S. PATENT DOCUMENTS

| | | | |
|---|---|---|---|
| 3,283,297 A | 11/1966 | Pfenninghausen et al. |
| 4,404,639 A | 9/1983 | McGuire |
| 4,989,146 A | 1/1991 | Imajo |
| 5,173,691 A | 12/1992 | Sumner |
| 5,182,555 A | 1/1993 | Sumner |
| 5,359,529 A | 10/1994 | Snider |
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |
| 5,508,931 A | 4/1996 | Snider |
| 5,546,305 A | 8/1996 | Kondo |
| 5,551,064 A | 8/1996 | Nobbe et al. |
| 5,563,788 A | 10/1996 | Yoon |
| 5,590,040 A | 12/1996 | Abe et al. |
| 5,635,924 A | 6/1997 | Tran et al. |
| 5,636,245 A | 6/1997 | Ernst et al. |

(Continued)

FOREIGN PATENT DOCUMENTS

DE    10047279    4/2002

(Continued)

OTHER PUBLICATIONS

"The Flawed Future of Radio", Acidus' Article published in 2600 Magazine; Release date Jan. 15, 2003; 5 pages.

(Continued)

*Primary Examiner* — Dwayne D Bost
*Assistant Examiner* — Joseph Dean, Jr.
(74) *Attorney, Agent, or Firm* — Plumsea Law Group, LLC

(57) ABSTRACT

A method is provided for providing weather data to a vehicle comprising the steps of: (a) receiving a broadcast signal containing weather data referenced to a plurality of cells arranged in a grid corresponding to a geographic map; (b) determining the present location, speed, and direction of the vehicle; (c) calculating a geographic region for which the weather data will affect the vehicle user based upon the current location, speed, and direction of the vehicle; (d) filtering the weather data to yield filtered data comprising at least one of the plurality of cells correlated to the previously calculated geographic region; and (e) formatting the filtered data for display to vehicle occupants.

35 Claims, 28 Drawing Sheets

U.S. PATENT DOCUMENTS

| | | | |
|---|---|---|---|
| 5,648,768 A | 7/1997 | Bouve | |
| 5,649,300 A | 7/1997 | Snyder et al. | |
| 5,661,787 A | 8/1997 | Pocock | |
| 5,664,948 A | 9/1997 | Dimitriadis et al. | |
| 5,671,195 A | 9/1997 | Lee | |
| 5,682,525 A | 10/1997 | Bouve et al. | |
| 5,696,676 A | 12/1997 | Takaba | |
| 5,699,056 A | 12/1997 | Yoshida | |
| 5,757,645 A | 5/1998 | Schneider et al. | |
| 5,774,827 A | 6/1998 | Smith et al. | |
| 5,802,545 A | 9/1998 | Coverdill | |
| 5,862,510 A | 1/1999 | Saga et al. | |
| 5,864,305 A | 1/1999 | Rosenquist | |
| 5,878,056 A | 3/1999 | Black et al. | |
| 5,892,463 A | 4/1999 | Hikita et al. | |
| 5,926,108 A | 7/1999 | Wicks et al. | |
| 5,931,878 A | 8/1999 | Chapin, Jr. | |
| 5,959,577 A | 9/1999 | Fan et al. | |
| 5,964,811 A | 10/1999 | Ishii et al. | |
| 5,982,298 A | 11/1999 | Lappenbusch et al. | |
| 5,999,882 A | 12/1999 | Simpson et al. | |
| 6,018,699 A | 1/2000 | Baron, Sr. et al. | |
| 6,032,046 A | 2/2000 | Nakano | |
| 6,073,007 A | 6/2000 | Doyle | |
| 6,078,865 A | 6/2000 | Koyanagi | |
| 6,084,510 A * | 7/2000 | Lemelson et al. | 340/539.13 |
| 6,085,146 A | 7/2000 | Kuribayashi et al. | |
| 6,091,956 A * | 7/2000 | Hollenberg | 455/456.5 |
| 6,111,521 A | 8/2000 | Mulder et al. | |
| 6,169,894 B1 | 1/2001 | McCormick et al. | |
| 6,195,602 B1 | 2/2001 | Hazama et al. | |
| 6,208,935 B1 | 3/2001 | Yamada et al. | |
| 6,212,388 B1 | 4/2001 | Seo | |
| 6,236,330 B1 | 5/2001 | Cohen | |
| 6,240,364 B1 | 5/2001 | Kerner et al. | |
| 6,243,647 B1 * | 6/2001 | Berstis et al. | 701/213 |
| 6,246,320 B1 | 6/2001 | Monroe | |
| 6,266,607 B1 | 7/2001 | Meis et al. | |
| 6,266,608 B1 | 7/2001 | Pertz | |
| 6,275,774 B1 | 8/2001 | Baron, Sr. et al. | |
| 6,292,723 B1 | 9/2001 | Brogan et al. | |
| 6,297,748 B1 | 10/2001 | Lappenbusch et al. | |
| 6,308,120 B1 | 10/2001 | Good | |
| 6,314,370 B1 | 11/2001 | Curtright | |
| 6,317,686 B1 | 11/2001 | Ran | |
| 6,329,925 B1 | 12/2001 | Skiver et al. | |
| 6,330,499 B1 | 12/2001 | Chou et al. | |
| 6,335,729 B2 | 1/2002 | Nunokawa et al. | |
| 6,339,736 B1 | 1/2002 | Moskowitz et al. | |
| 6,351,709 B2 | 2/2002 | King et al. | |
| 6,356,822 B1 | 3/2002 | Diaz et al. | |
| 6,356,839 B1 | 3/2002 | Monde et al. | |
| 6,362,730 B2 | 3/2002 | Razavi et al. | |
| 6,370,454 B1 | 4/2002 | Moore | |
| 6,373,883 B1 | 4/2002 | Soerensen et al. | |
| 6,381,533 B1 | 4/2002 | Crane et al. | |
| 6,381,538 B1 | 4/2002 | Robinson et al. | |
| 6,389,337 B1 | 5/2002 | Kolls | |
| 6,397,067 B1 | 5/2002 | Tanaka et al. | |
| 6,408,307 B1 | 6/2002 | Semple et al. | |
| 6,421,593 B1 | 7/2002 | Kempen et al. | |
| 6,434,455 B1 | 8/2002 | Snow et al. | |
| 6,438,490 B2 | 8/2002 | Ohta | |
| 6,459,961 B1 | 10/2002 | Obradovich et al. | |
| 6,477,452 B2 | 11/2002 | Good | |
| 6,480,105 B2 | 11/2002 | Edwards | |
| 6,480,145 B1 | 11/2002 | Hasegawa | |
| 6,490,525 B2 | 12/2002 | Baron, Sr. et al. | |
| 6,493,633 B2 | 12/2002 | Baron, Sr. et al. | |
| 6,510,317 B1 | 1/2003 | Marko et al. | |
| 6,522,250 B1 | 2/2003 | Ernst et al. | |
| 6,526,335 B1 | 2/2003 | Treyz et al. | |
| 6,529,143 B2 | 3/2003 | Mikkola et al. | |
| 6,539,269 B1 | 3/2003 | Jarrow et al. | |
| 6,539,302 B1 | 3/2003 | Bender et al. | |
| 6,542,794 B2 | 4/2003 | Obradovich et al. | |
| 6,542,822 B1 | 4/2003 | Froeberg | |
| 6,549,833 B2 | 4/2003 | Katagishi et al. | |
| 6,552,682 B1 | 4/2003 | Fan | |
| 6,553,290 B1 | 4/2003 | Pillar | |
| 6,553,308 B1 | 4/2003 | Uhlmann et al. | |
| 6,553,313 B1 | 4/2003 | Froeberg | |
| 6,577,934 B2 | 6/2003 | Matsunaga et al. | |
| 6,583,734 B2 | 6/2003 | Bates et al. | |
| 6,587,759 B2 | 7/2003 | Obradovich et al. | |
| 6,587,777 B1 | 7/2003 | St. Pierre | |
| 6,587,787 B1 | 7/2003 | Yokota | |
| 6,590,507 B2 | 7/2003 | Burns | |
| 6,594,576 B2 | 7/2003 | Fan et al. | |
| 6,597,904 B1 | 7/2003 | Neustein | |
| 6,603,405 B2 | 8/2003 | Smith | |
| 6,604,038 B1 | 8/2003 | Leseky et al. | |
| 6,608,559 B1 | 8/2003 | Lemelson et al. | |
| 6,609,004 B1 | 8/2003 | Morse et al. | |
| 6,611,740 B2 | 8/2003 | Lowrey et al. | |
| 6,611,753 B1 | 8/2003 | Millington | |
| 6,615,130 B2 | 9/2003 | Myr | |
| 6,615,133 B2 | 9/2003 | Moskowitz et al. | |
| 6,615,186 B1 | 9/2003 | Kolls | |
| 6,618,669 B2 | 9/2003 | Ota et al. | |
| 6,636,721 B2 | 10/2003 | Threadgill et al. | |
| 6,647,417 B1 | 11/2003 | Hunter et al. | |
| 6,654,600 B1 | 11/2003 | Pollak et al. | |
| 6,657,558 B2 * | 12/2003 | Horita et al. | 340/995.13 |
| 6,658,485 B1 | 12/2003 | Baber et al. | |
| 6,662,090 B2 | 12/2003 | Toyama et al. | |
| 6,662,091 B2 | 12/2003 | Wilson et al. | |
| 6,664,922 B1 | 12/2003 | Fan | |
| 6,668,219 B2 | 12/2003 | Hwang et al. | |
| 6,677,854 B2 | 1/2004 | Dix | |
| 6,680,694 B1 | 1/2004 | Knockeart et al. | |
| 6,681,120 B1 | 1/2004 | Kim | |
| 6,691,025 B2 | 2/2004 | Reimer | |
| 6,697,633 B1 | 2/2004 | Dogan et al. | |
| 6,701,231 B1 | 3/2004 | Borugian | |
| 6,701,232 B2 | 3/2004 | Yamaki | |
| 6,707,421 B1 | 3/2004 | Drury et al. | |
| 6,708,108 B2 | 3/2004 | Jones | |
| 6,711,398 B1 | 3/2004 | Talaie et al. | |
| 6,714,797 B1 | 3/2004 | Rautila | |
| 6,720,920 B2 | 4/2004 | Breed et al. | |
| 6,721,685 B2 | 4/2004 | Kodama | |
| 6,724,827 B1 | 4/2004 | Patsiokas et al. | |
| 6,730,940 B1 | 5/2004 | Steranka et al. | |
| 6,732,031 B1 | 5/2004 | Lightner et al. | |
| 6,735,416 B1 | 5/2004 | Marko et al. | |
| 6,735,504 B2 | 5/2004 | Katagishi et al. | |
| 6,738,697 B2 | 5/2004 | Breed | |
| 6,741,188 B1 | 5/2004 | Miller et al. | |
| 6,741,834 B1 | 5/2004 | Godwin | |
| 6,748,317 B2 | 6/2004 | Maruyama et al. | |
| 6,754,485 B1 | 6/2004 | Obradovich et al. | |
| 6,754,570 B2 | 6/2004 | Iihoshi et al. | |
| 6,757,712 B1 | 6/2004 | Bastian et al. | |
| 6,785,551 B1 | 8/2004 | Richard | |
| 6,798,358 B2 | 9/2004 | Joyce et al. | |
| 6,804,589 B2 | 10/2004 | Foxford et al. | |
| 6,810,323 B1 | 10/2004 | Bullock et al. | |
| 6,810,328 B2 | 10/2004 | Yokota et al. | |
| 6,812,860 B1 | 11/2004 | Schwarzwalder, Jr. | |
| 6,812,888 B2 | 11/2004 | Drury et al. | |
| 6,813,549 B2 | 11/2004 | Good | |
| 6,816,778 B2 | 11/2004 | Diaz | |
| 6,819,986 B2 | 11/2004 | Hong et al. | |
| 6,823,169 B2 | 11/2004 | Marko et al. | |
| 6,823,263 B1 | 11/2004 | Kelly et al. | |
| 6,836,539 B2 | 12/2004 | Katou et al. | |
| 6,836,667 B1 | 12/2004 | Smith, Jr. | |
| 6,847,871 B2 | 1/2005 | Malik et al. | |
| 6,847,872 B2 | 1/2005 | Bodin et al. | |
| 6,847,889 B2 | 1/2005 | Park et al. | |
| 6,850,823 B2 | 2/2005 | Eun et al. | |
| 6,859,720 B2 | 2/2005 | Satoh et al. | |
| 6,870,487 B2 | 3/2005 | Nuesser et al. | |
| 6,871,067 B2 | 3/2005 | Clark et al. | |
| 6,901,374 B1 | 5/2005 | Himes | |
| 6,911,918 B2 | 6/2005 | Chen | |

| | | |
|---|---|---|
| 6,920,382 B2 | 7/2005 | Katagishi et al. |
| 6,928,423 B1 | 8/2005 | Yamanaka |
| 6,944,430 B2 | 9/2005 | Berstis |
| 6,971,070 B2 | 11/2005 | Obradovich et al. |
| 6,978,206 B1 | 12/2005 | Pu et al. |
| 6,983,200 B2 | 1/2006 | Bodin et al. |
| 6,987,964 B2 | 1/2006 | Obradovich et al. |
| 6,988,034 B1 | 1/2006 | Marlatt et al. |
| 7,010,297 B2 | 3/2006 | Yokota |
| 7,024,310 B2 | 4/2006 | Root et al. |
| 7,053,780 B1 | 5/2006 | Straub et al. |
| 7,054,612 B2 | 5/2006 | Patel |
| 7,089,116 B2 | 8/2006 | Smith |
| 7,170,390 B2 | 1/2007 | Quinones et al. |
| 7,174,171 B2 | 2/2007 | Jones |
| 7,174,301 B2 | 2/2007 | Florance et al. |
| 7,177,651 B1 | 2/2007 | Almassy |
| 7,184,866 B2 | 2/2007 | Squires et al. |
| 7,210,142 B2 | 4/2007 | Hilt et al. |
| 7,216,109 B1 | 5/2007 | Donner |
| 2001/0001848 A1 | 5/2001 | Oshizawa et al. |
| 2002/0002534 A1 | 1/2002 | Davis et al. |
| 2002/0008637 A1* | 1/2002 | Lemelson et al. ............. 340/907 |
| 2002/0016655 A1 | 2/2002 | Joao |
| 2002/0027511 A1* | 3/2002 | Horita et al. ................. 340/988 |
| 2002/0027512 A1* | 3/2002 | Horita et al. ................. 340/988 |
| 2002/0029339 A1 | 3/2002 | Rowe |
| 2002/0049531 A1 | 4/2002 | Tanaka et al. |
| 2002/0067289 A1 | 6/2002 | Smith |
| 2002/0077741 A1 | 6/2002 | Hanebrink |
| 2002/0082771 A1 | 6/2002 | Anderson |
| 2002/0103582 A1 | 8/2002 | Ohmura et al. |
| 2002/0128773 A1 | 9/2002 | Chowanic et al. |
| 2002/0152021 A1 | 10/2002 | Ota et al. |
| 2002/0152115 A1 | 10/2002 | Morita et al. |
| 2002/0161841 A1 | 10/2002 | Kinnunen |
| 2002/0198632 A1 | 12/2002 | Breed et al. |
| 2003/0069683 A1 | 4/2003 | Lapidot |
| 2003/0098782 A1 | 5/2003 | Eastman et al. |
| 2003/0117982 A1 | 6/2003 | Minnick |
| 2003/0120426 A1 | 6/2003 | Baron, Sr. et al. |
| 2003/0169182 A1 | 9/2003 | Wilhelm et al. |
| 2003/0195814 A1 | 10/2003 | Striemer |
| 2003/0212479 A1 | 11/2003 | Baghshomali et al. |
| 2003/0216859 A1 | 11/2003 | Martell et al. |
| 2003/0225516 A1 | 12/2003 | DeKock et al. |
| 2003/0236613 A1 | 12/2003 | Satoh et al. |
| 2004/0012501 A1 | 1/2004 | Mazzara et al. |
| 2004/0043760 A1 | 3/2004 | Rosenfeld et al. |
| 2004/0059781 A1 | 3/2004 | Yoakum et al. |
| 2004/0068364 A1 | 4/2004 | Zhao et al. |
| 2004/0073356 A1 | 4/2004 | Craine |
| 2004/0075774 A1 | 4/2004 | Chang et al. |
| 2004/0080430 A1 | 4/2004 | Videtich |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0148099 A1 | 7/2004 | Kim |
| 2004/0198217 A1 | 10/2004 | Lee et al. |
| 2004/0199326 A1 | 10/2004 | Jung et al. |
| 2004/0203919 A1 | 10/2004 | Ross et al. |
| 2004/0204821 A1 | 10/2004 | Tu |
| 2004/0225437 A1 | 11/2004 | Endo et al. |
| 2004/0233070 A1 | 11/2004 | Finnern |
| 2004/0233101 A1 | 11/2004 | Kim |
| 2004/0239526 A1 | 12/2004 | Nakajima |
| 2004/0239531 A1 | 12/2004 | Adamczyk |
| 2004/0252197 A1 | 12/2004 | Fraley et al. |
| 2004/0260786 A1 | 12/2004 | Barile |
| 2005/0015197 A1 | 1/2005 | Ohtsuji et al. |
| 2005/0015199 A1 | 1/2005 | Lokshin et al. |
| 2005/0024236 A1* | 2/2005 | Gosdin et al. ................. 340/905 |
| 2005/0027436 A1 | 2/2005 | Yoshikawa et al. |
| 2005/0027449 A1 | 2/2005 | Marsh |
| 2005/0038596 A1 | 2/2005 | Yang et al. |
| 2005/0043880 A1 | 2/2005 | Yamane et al. |
| 2005/0046594 A1 | 3/2005 | Taylor |
| 2005/0065678 A1 | 3/2005 | Smith et al. |
| 2005/0137790 A1 | 6/2005 | Yamada et al. |
| 2005/0187714 A1 | 8/2005 | Brulle-Drews |
| 2005/0197775 A1* | 9/2005 | Smith ............................. 702/3 |
| 2005/0203698 A1 | 9/2005 | Lee |
| 2005/0221876 A1 | 10/2005 | Van Bosch et al. |
| 2005/0222760 A1 | 10/2005 | Cabral et al. |
| 2005/0222771 A1* | 10/2005 | Matsumoto ..................... 702/3 |
| 2005/0259606 A1* | 11/2005 | Shutter et al. ................. 370/317 |
| 2005/0273218 A1 | 12/2005 | Breed et al. |
| 2005/0288856 A1 | 12/2005 | Uyeki et al. |
| 2006/0022846 A1 | 2/2006 | Tummala |
| 2006/0030298 A1 | 2/2006 | Burton et al. |
| 2006/0038674 A1 | 2/2006 | Sumcad et al. |
| 2006/0055565 A1 | 3/2006 | Kawamata et al. |
| 2006/0058950 A1 | 3/2006 | Kato et al. |
| 2006/0080032 A1 | 4/2006 | Cooper et al. |
| 2006/0258379 A1 | 11/2006 | Oesterling et al. |
| 2006/0287818 A1 | 12/2006 | Okude et al. |
| 2006/0293846 A1 | 12/2006 | Lippert |
| 2007/0010258 A1 | 1/2007 | Landschaft et al. |
| 2007/0042812 A1 | 2/2007 | Basir |
| 2007/0054702 A1 | 3/2007 | Rokusek et al. |
| 2007/0078595 A1 | 4/2007 | Song |
| 2007/0106454 A1* | 5/2007 | Nonaka ......................... 701/200 |
| 2007/0168524 A1* | 7/2007 | Chao et al. ..................... 709/228 |
| 2008/0088480 A1 | 4/2008 | Rozum et al. |
| 2008/0106436 A1 | 5/2008 | Breed |

FOREIGN PATENT DOCUMENTS

| | | |
|---|---|---|
| DE | 20315556 | 5/2004 |
| EP | 0973299 | 1/2000 |
| FR | 2700047 | 7/1994 |
| JP | 6201394 | 7/1994 |
| JP | 10-150477 | 6/1998 |
| JP | 10307042 | 11/1998 |
| JP | 11002539 | 1/1999 |
| JP | 2000121377 | 4/2000 |
| JP | 2000193469 | 7/2000 |
| JP | 2001099665 | 4/2001 |
| JP | 2001-216555 | 8/2001 |
| JP | 2002-032276 | 1/2002 |
| JP | 2002-077295 | 3/2002 |
| JP | 2002-084298 | 3/2002 |
| JP | 2002-318844 | 10/2002 |
| JP | 2003004465 | 1/2003 |
| JP | 2003004474 | 1/2003 |
| JP | 2003294470 | 10/2003 |
| JP | 2003329472 | 11/2003 |
| JP | 2005147708 | 6/2005 |
| JP | 2006003272 | 1/2006 |
| WO | WO2005/088255 | 9/2005 |

OTHER PUBLICATIONS

"Sirius Satellite Radio—Help", Help, dated Oct. 6, 2002 by archive.org; 8 pages.

"The Application of a Novel Two-Way Mobile Satellite Communications and Vehicle Tracking System to the Transportation Industry", Jacobs et al., Feb. 1991, IEEE Transactions on Vehicular Technology, vol. 40, No. 1, pp. 57-63.

The Application of a Novel Two-Way Mobile Satellite Communications and Vehicle Tracking System to the Transportation Industry, Jacobs et al, Feb. 1999, IEEE Transactions on Vehicular Technology, vol. 40, No. 1, pp. 57-63.

"The Application of a Novel Two-Way Mobile Satellite Communications and Vehicle Tracking System to the Transportation Industry", Jacobs et al., Feb. 1991, IEEE Transactions on Vehicular Technology, vol. 40, No. 1, pp. 57-63.

* cited by examiner

Longitude Data Array Set

| 1 | Navigation System |
| 1-1 | GPS Antenna |
| 2 | Weather Data Receiver |
| 2-1 | Radio Antenna |
| 3 | Display |
| 4 | Audio Unit |
| 5 | Speed Sensor |
| 6 | Yaw Rate Sensor |
| 7 | Speaker |

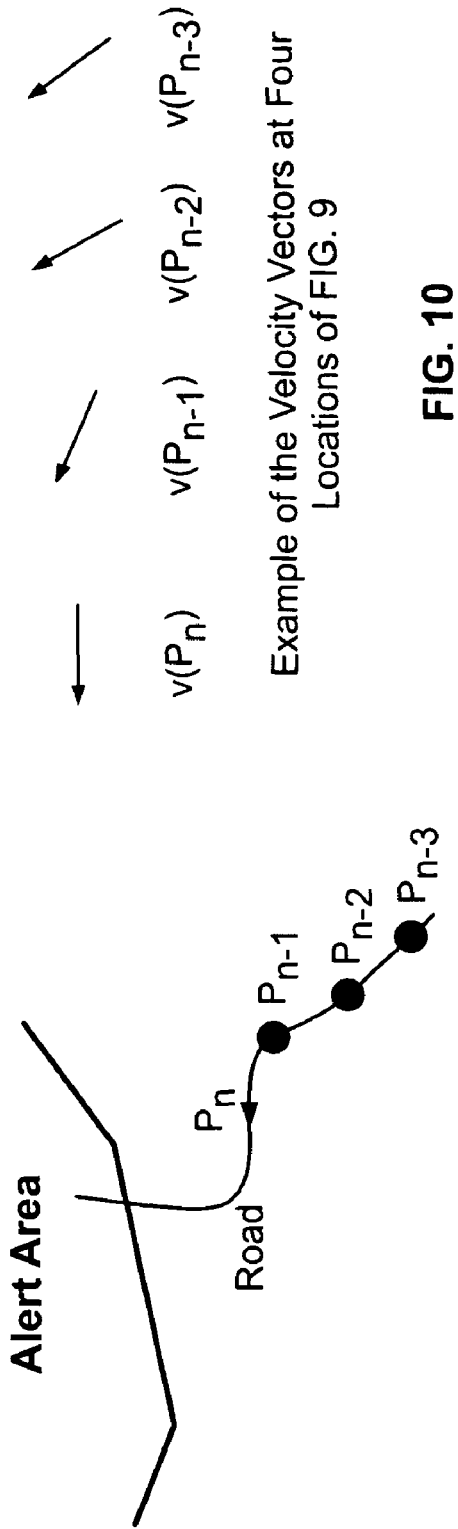
FIG. 9
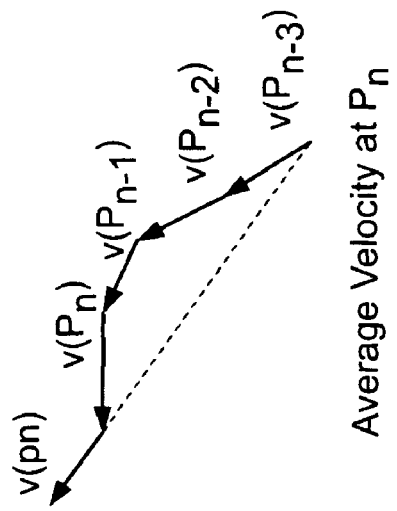
FIG. 10
Example of the Velocity Vectors at Four Locations of FIG. 9
FIG. 11
Average Velocity at $P_n$

| ID | Warning Status |
|---|---|
| 0 | Tornado Warning |
| 1 | Thunderstorm Warning |
| 2 | Hurricane Warning |
| ... | |

FIG. 13

| Current / Forecast Weather ||||
|---|---|---|---|
| 3bit | 2bit | 1bit | 0bit |
| 0 Clear ||||
| 1 Partly Cloudy ||||
| 2 Cloudy ||||
| 3 Rain ||||
| 4 Heavy Rain ||||
| 5 Freezing Rain ||||
| 6 Snow ||||
| 7 No Data ||||
| 8 ..... ||||

FIG. 12

| | |
|---|---|
| ID | A Unique 3-digit Identifier for the Storm. |
| AZ | The Direction of the Storm in Degrees from the Radar Source. |
| RANGE | The Distance of the Storm in Nautical Miles from the Radar Source. |
| TVS | The Likelihood of a Tornado Cortex Signature (Probably, Possible or Absolutely). |
| MESO | The Likelihood of Mesocyclonic Activity (Probable, Possible or Absolutely). |
| HAIL | The Likelihood of Hail (Probably, Possible or Absolutely). |
| DBZM | The Maximum DBZ Level (A Measurement of Participation Intensity) in the Storm. |
| FCST_ANGLE | Forecasted Movement Angle (Storm Path) in Degrees. |
| FCST_MVMT | Forecasted Movement Speed in Nautical Miles per Hour. |

FIG. 20

| Storm ID | Storm Type | Storm Severity | Cell#/ Presence Qualifier | ... | Cell/#/ Presence Qualifier |
|---|---|---|---|---|---|
| | | | | | |

FIG. 21

| Message ID | Weather Type | Description |
|---|---|---|
| 0x00 | Mesh Weather | Mesh Weather Data. Supports Current Weather and Forecast Weather. |
| 0x10 | Warning | Linked to the Mesh Location |
| 0x20 | Mesh Radar / Satellite | The Radar / Satellite Image Data Divided by Mesh |

FIG. 24

Mesh Weather

| | 7bit | 6bit | 5bit | 4bit | 3bit | 2bit | 1bit | 0bit |
|---|---|---|---|---|---|---|---|---|
| Message ID | 0Byte | | | | 0x00 | | | |
| Mesh Parameters | 1Byte | Resolution | | | COL | | | |
| | 2Byte | Time ID | | | | | COL_SUB | |
| Mesh Data | Various | Mesh Weather ID Array | | | | | | |

FIG. 25A

| Resolution | Description |
|---|---|
| 0 | 1 Degree Mesh |
| 1 | 1/4 Degree Mesh |
| 2 | 1/8 Degree Mesh |
| 3 | 1/16 Degree Mesh |

FIG. 25B

Mesh Weather ID

| 7bit | 6bit | 5bit | 4bit | 3bit | 2bit | 1bit | 0bit |
|---|---|---|---|---|---|---|---|
| Repeat | | Lightning | High Winds | Heavy | 0 Clear<br>1 Partly Cloudy<br>2 Cloudy<br>3 Fog<br>4 Rain<br>5 Freezing Rain<br>6 Snow<br>7 No Data | | |

FIG. 25C

| Repeat | Description |
|---|---|
| 0 | No Repeat |
| 1 | Repeat Number = 1 |
| 2 | Next 4bit is the Repeat # Info |
| 3 | Next 1 Byte is the Repeat # Info |

FIG. 25D

Mesh Weather

| Time ID | Description | |
|---|---|---|
| 0 | Now | Current Weather |
| 1-6 | 1-6 Hours Later | |
| 7 | 9 Hours Later | Forecast Weather |
| 8 | 12 Hours Later | |
| 9 | 15 Hours Later | |
| 10 | Today | |
| 11 | Tonight | |
| 12 | Tomorrow | |
| 13 | Tomorrow Night | |
| 14 | The Day After Tomorrow | |
| 15 | The Day After Tomorrow Night | |

FIG. 25E

Warning Message

| | | 7bit | 6bit | 5bit | 4bit | 3bit | 2bit | 1bit | 0bit |
|---|---|---|---|---|---|---|---|---|---|
| Message ID | 0Byte | | | | 0x10 | | | | |
| Warning Detail | 1Byte | | Resolution | | | COL | | | |
| | 2Byte | | ROW_SUB | | | | COL_SUB | | |
| | 3Byte | 0 | Cancel Flag | | | ROW | | | |
| | 4Byte | | | | COL_CNT | | | | |
| | 5Byte | | | | ROW_CNT | | | | |
| | 6Byte | | | | Warning ID | | | | |
| | 7Byte | | | FROM_DATE | | | | Level bit 1,0 | |
| | 8Byte | | | UNTIL_DATE | | | | Level bit 3,2 | |
| | 9Byte | | | | UNTIL_TIME | | | | |
| Warning Bit Data | Various | | | | Compressed 0/1 Bit Array | | | | |

FIG. 26A

| Resolution | Description |
|---|---|
| 0 | 1 Degree Mesh |
| 1 | 1/4 Degree Mesh |
| 2 | 1/8 Degree Mesh |
| 3 | 1/16 Degree Mesh |

FIG. 26B

| Level | Description |
|---|---|
| 0 | No Warning Level Info |
| 1-15 | Warning Level 1-15 |

FIG. 26C

Warning Message

| FROM_DATE (UTC) | | Date2 (2,1,0bit) | |
|---|---|---|---|
| Date (5,4,3bit) | | 0 | No Date2 Info |
| 0 | No Date Info | 1 | Early Morning |
| 1 | Sun | 2 | Morning |
| 2 | Mon | 3 | Noon |
| 3 | Tues | 4 | Afternoon |
| 4 | Wed | 5 | Evening |
| 5 | Thurs | 6 | Night |
| 6 | Fri | 7 | Late Night |
| 7 | Sat | | |

FIG. 26D

Warning Message

UNTIL_DATE (UTC)

| Date (5,4,3bit) | | Date2 (2,1,0bit) | |
|---|---|---|---|
| 0 | No Date Info | 0 | See UNTIL_TIME |
| 1 | Sun | 1 | Early Morning |
| 2 | Mon | 2 | Morning |
| 3 | Tues | 3 | Noon |
| 4 | Wed | 4 | Afternoon |
| 5 | Thurs | 5 | Evening |
| 6 | Fri | 6 | Night |
| 7 | Sat | 7 | Late Night |

FIG. 26E

UNTIL_TIME (UTC)

| Hour (7,6,5,4,3bit) | | Minutes (2,1,0bit) | |
|---|---|---|---|
| 0 - 0xb | 12AM - 11AM | 0 | 0 |
| 0xc - 0x17 | 12PM - 11PM | 1 | 10 |
| 0x18 | Through Today | 2 | 15 |
| 0x19 | Rest of Tonight | 3 | 20 |
| 0x1a | Through Tomorrow | 4 | 30 |
| 0x1b | Reserved | 5 | 40 |
| 0x1c | | 6 | 45 |
| 0x1d | | 7 | 50 |
| 0x1e | | | |
| 0x1f | No Time Info | | |

FIG. 26F

Warning Message Format (Warning ID)

| Warning ID | | Type |
|---|---|---|
| 0 | | Tornado |
| 1 | | Severe Thunderstorm |
| 2 | | Hurricane |
| 3 | Warnings | Tropical Storm |
| 4 | | Flash Flood |
| 5 | | Flood |
| 6 | | Blizzard |
| 7 | | Winter Storm |
| 8 | | Ice Storm |
| 9 | | High Wind |
| 10 | | Tornado |
| 11 | | Severe Thunderstorm |
| 12 | | Hurricane |
| 13 | Watch | Tropical Storm |
| 14 | | Flash Flood |
| 15 | | Blizzard |
| 16 | | Winter Storm |

| Warning ID | | Type |
|---|---|---|
| 17 | | Small Stream Flood |
| 18 | | Snow |
| 19 | Advisory | Freezing Rain |
| 20 | | Winter Weather |
| 21 | | High Wind |
| 22 | | Closed |
| 23 | Road Conditions | Slippery |
| 24 | | Ice |
| 25 | | Snow |
| 26 | | With Shear |
| 27 | Storm | With Small Hail |
| 28 | | With Large Hail |
| 29 | | With Shear & Small Hail |
| 30 | | With Shear & Large Hail |
| 31-255 | | Reserved |

FIG. 26G

| Mesh Radar / Satellite |||||||||
|---|---|---|---|---|---|---|---|---|
| | | 7bit | 6bit | 5bit | 4bit | 3bit | 2bit | 1bit | 0bit |
| Message ID | 0Byte | 0x20 |||||||
| Mesh Parameters | 1Byte | Resolution | | | COL ||||
| | 2Byte | Hour | | | | COL_SUB |||
| | 3Byte | Time | AM/PM | Minutes ||||||
| Mesh Data | Various | Mesh Radar / Satellite ID ||||||||

FIG. 27A

| Mesh Radar / Satellite ID ||||||||
|---|---|---|---|---|---|---|---|
| 7bit | 6bit | 5bit | 4bit | 3bit | 2bit | 1bit | 0bit |
| Repeat ||| 0 No Data<br>1 Less than 15DBZ<br>2 More than 15DBZ<br>3 More than 30DBZ<br>4 More than 40DBZ<br>5 More than 45DBZ<br>6 More than 50DBZ<br>7 More than 55DBZ |||| 0 No Data<br>1 No Cloud<br>2 Cloud Level 1<br>3 Cloud Level 2<br>4 Cloud Level 3<br>5 Cloud Level 4<br>6 Cloud Level 5<br>7 Cloud Level 6 |||

FIG. 27B

| Repeat | Description |
|---|---|
| 0 | No Repeat |
| 1 | Repeat Number = 1 |
| 2 | Next 4bit is the Repeat # Info |
| 3 | Next 1 Byte is the Repeat # Info |

FIG. 27C

Mesh Radar / Satellite

| Resolution | Description |
|---|---|
| 0 | 1 Degree Mesh |
| 1 | 1/4 Degree Mesh |
| 2 | 1/8 Degree Mesh |
| 3 | 1/16 Degree Mesh |

FIG. 27D

| Time | Description |
|---|---|
| 0 | No Time Info |
| 1 | Time Info is Available |

FIG. 27E

| Hour | Description |
|---|---|
| 0 | No Captured Hour Info |
| 1-12 | Captured 1-12 O'Clock |

FIG. 27F

| AM/PM | Description |
|---|---|
| 0 | Captured AM |
| 1 | Captured PM |

FIG. 27G

| Minutes | Description |
|---|---|
| 0-59 | Captured 0-59 Minutes |
| 63 | No Captured Minutes Info |

FIG. 27H

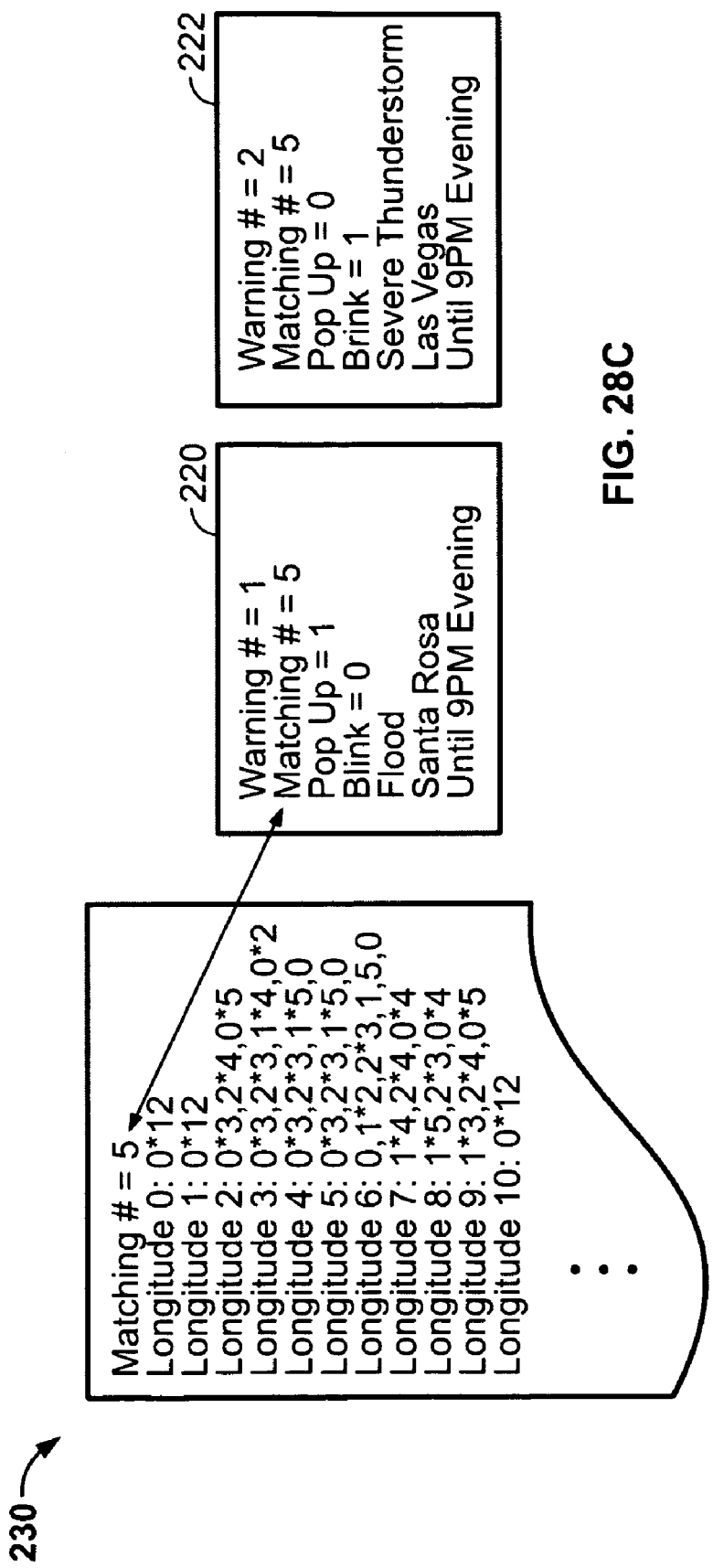

SYSTEM AND METHOD FOR PROVIDING WEATHER WARNINGS AND ALERTS

CROSS-REFERENCE TO RELATED APPLICATION

This application claims priority pursuant to 35 U.S.C. §119(e) to U.S. Provisional Application No. 60/711,606, filed Aug. 25, 2005, which application is specifically incorporated herein, in its entirety, by reference. Additionally, this application claims priority pursuant to 35 U.S.C. §119(e) to U.S. Provisional Application No. 60/739,622, filed Nov. 23, 2005, which application is specifically incorporated herein, in its entirety, by reference.

BACKGROUND OF THE INVENTION

1. Field of the Invention

The present invention relates to a system and method for providing current weather warnings and alerts to vehicle occupants. More particularly, the present invention is directed to a weather information system that collects, formats, and broadcasts weather data to vehicles.

2. Description of Related Art

Navigation systems for determining a route from a start point to a destination point are well known in the art. In addition, navigation systems having capabilities for determining the geographic position of a reference point are also well known in the art (e.g., a Global Positioning System (GPS) or a self-contained system having distance and bearing sensors). As an example, a commonly used navigation system allows a user (or driver) of a vehicle to enter a destination place into the navigation system. The navigation system then looks up an appropriate route from an original point (using geographic positioning capabilities) to the destination point in a road map database (e.g., the route may be a route having the shortest distance from the start point to the destination, one that would take the vehicle the least time, or some other route), and guides the user to the destination point along the searched route through a visual display or vocal guide.

Recently, navigation systems have been improved to provide and utilize vehicle-related or geographically-relevant, real time traffic information in guiding the user to his/her destination, described in further detail in U.S. patent application Ser. No. 11/093,919, filed Mar. 29, 2005, titled Display Method and System for a Vehicle Navigation System, the disclosure of which is incorporated in its entirety herein by reference. However, there remains a need for systems and methods for collecting, utilizing, and providing vehicle-related, real time weather information and alerts to the user. In addition, there is a need for a vehicle navigation system that receives, processes, and displays real time weather alerts and information to the user.

Navigations systems have also recently been improved to allow for the broadcasting of data such as traffic information to a vehicle via a broadcast network such as XM Satellite Radio, described in further detail in U.S. patent application Ser. No. 11/266,879, filed Nov. 4, 2005, titled Data Broadcast Method for Traffic Information, the disclosure of which is incorporated in its entirety herein by reference. However, bandwidth and data transfer capacity over the broadcast network is limited, making conservation of bandwidth in future applications a necessity of design.

Accordingly, it would be advantageous to provide a vehicle navigation system that receives and processes real time information (e.g., traffic, weather, and other geographically-relevant or vehicle-related information) in guiding the user to his/her destination while making efficient use of limited broadcast bandwidth resources.

SUMMARY OF THE INVENTION

The present invention provides a weather information system for collecting, formatting, filtering, and delivering timely weather alerts and information to a vehicle navigation system, which in turn processes and displays the weather information for the vehicle occupants.

In accordance with one aspect of the embodiments described herein, there is provided a method for providing weather data to a vehicle comprising the steps of: (a) receiving a broadcast signal containing weather data referenced to a plurality of cells arranged in a grid corresponding to a geographic map; (b) determining the present location, speed, and direction of the vehicle; (c) calculating a geographic region for which the weather data will affect the vehicle user based upon the current location, speed, and direction of the vehicle; (d) filtering the weather data to yield filtered data comprising at least one of the plurality of cells correlated to the previously calculated geographic region; and (e) formatting the filtered data for display to vehicle occupants.

In accordance with another aspect of the embodiments described herein, there is provided a system for providing weather data to a vehicle having a telematics unit and a navigation system. The telematics unit is equipped to receive weather data over a broadcast network such that the weather data is referenced to a plurality of cells arranged in a grid corresponding to a geographic map. The navigation system is in electrical communication with the telematics unit for reception of the weather data and further comprises a display equipped to present the weather data to a user, a Global Positioning System antenna equipped to determine the vehicle location, a speed sensor equipped to determine the vehicle speed, and a yaw-rate sensor equipped to determine the vehicle direction. The navigation system is adapted to calculate a geographic region for which the weather data will affect the vehicle user based upon the current location, speed, and direction of the vehicle. At least one of the telematics unit and the navigation system is adapted to filter the weather data prior to user display based upon at least one of the plurality of cells correlated to the previously calculated geographic region.

In accordance with yet another aspect of the embodiments described herein, there is provided a method for providing weather warnings to a vehicle comprising the steps of: (a) receiving a first broadcast signal containing weather warning mesh data and a second broadcast signal containing weather warning information; (b) determining whether a current location of the vehicle is in or near the area to which the received weather warning mesh data and weather warning information apply; and (c) displaying a warning to the vehicle user if the current vehicle location is in or near the area to which the received weather warning mesh data and weather warning information apply.

BRIEF DESCRIPTION OF THE DRAWINGS

FIGS. 9-11 illustrate a method of determining whether a vehicle will enter/exit a weather alert area within a predetermined time period;

FIG. 12 provides an exemplary mesh cell field definition table for current and forecast weather conditions;

FIG. 13 is a table showing an exemplary weather warning status code for a data field of a mesh/grid cell;

FIG. 20 is a table showing the information that the NexRad attribute data may include for each storm;

FIG. 21 is a table showing an exemplary data structure comprising a storm profile;

FIG. 24 is a table showing three exemplary weather data formats that a weather information system can utilize in accordance with an embodiment of the present invention;

FIGS. 25A-25E illustrate a first exemplary weather data format (i.e., Mesh Weather format);

FIGS. 26A-26G illustrate a second exemplary weather data format (i.e., Warning Message/Warning ID format);

FIGS. 27A-27H illustrate a third exemplary weather data format (i.e., Mesh Radar/Satellite format);

FIGS. 28A-28D illustrate a weather warning data format;

DETAILED DESCRIPTION OF THE PREFERRED EMBODIMENT

The present invention provides a system that collects and formats regionally relevant and current weather information that is broadcast to vehicle navigation systems, while making efficient use of the available broadcast bandwidth.

Figure 1:
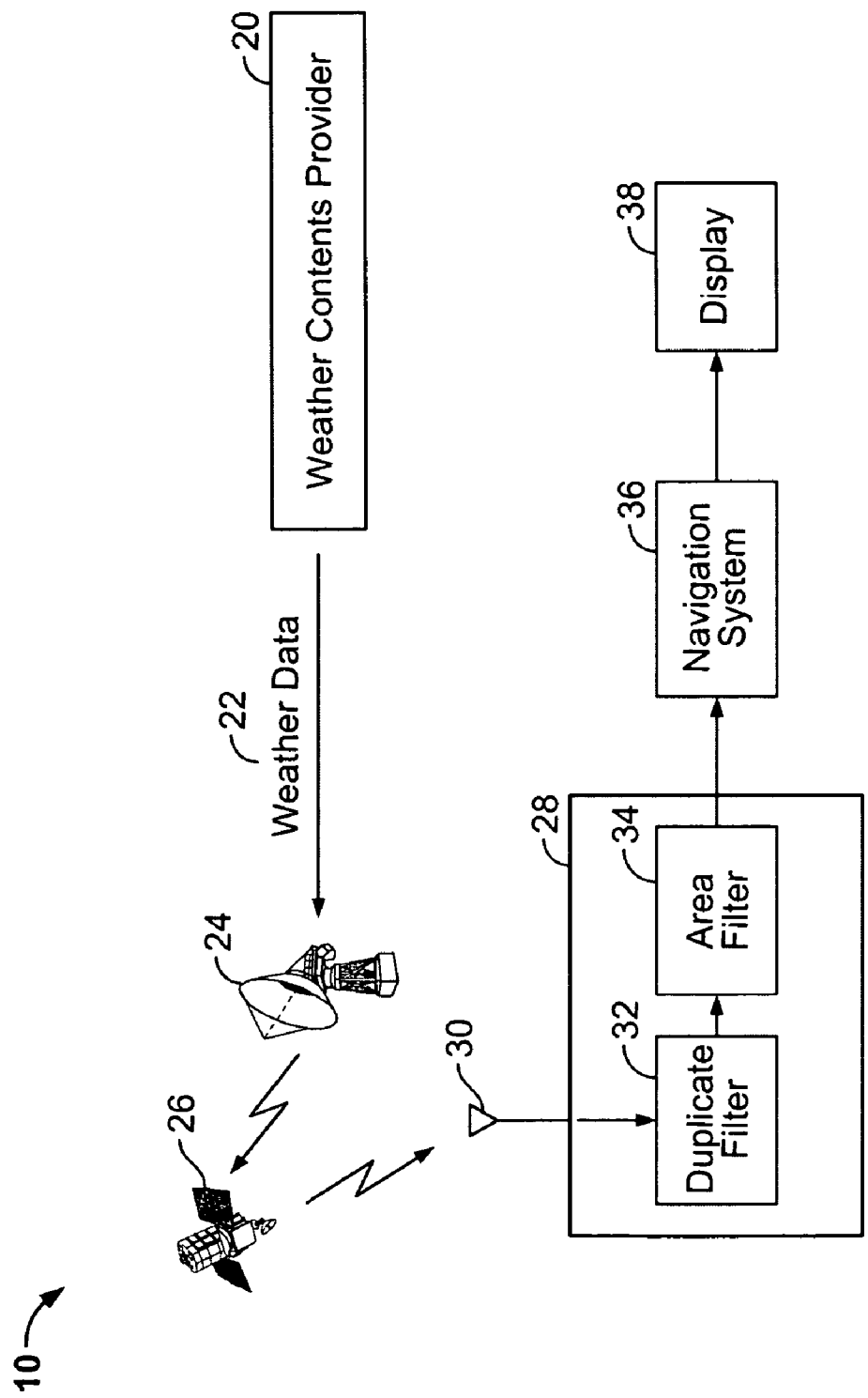
FIG. 1 is a block diagram of a weather information system in accordance with an embodiment of the present invention.

Referring first to FIG. 1, a weather information system 10 is illustrated in accordance with the present invention. In one embodiment, the weather information system 10 comprises a weather content provider 20, a satellite radio transmitter 24, a satellite 26, a telematics unit 28, and a navigation system 36.

The weather content provider 20 collects and formats the weather data 22 that is sent to the satellite radio transmitter 24, which in turn broadcasts the formatted weather data via the satellite 26.

The telematics unit 28 receives the broadcasted weather data from the satellite 26, and preferably filters the data to remove duplicate data and/or data that is not relevant to the geographic regions in which the vehicle is currently or will be traveling to. The telematics unit 28 comprises a duplicate filter 32 to remove duplicate data, as well as an area filter 34 to filter geographically irrelevant data. The filtered weather data is sent from the telematics unit 28 to the navigation system 36, which in turn processes and displays the data on a display unit 38 for the vehicle occupants.

The duplicate filter 32 and area filter 34 are optional, but generally desirable to reduce the amount of data that is received and processed by the navigation system 36. The same weather data is broadcasted until the weather data gets updated. The receiver stores the Mesh longitude number and Cyclic Redundancy Check (CRC). If the weather data comprises the same longitude number and CRC as the previous mesh data packet, the receiving telematics unit 28 filters and discards the duplicate data, thereby saving the navigation system 36 from having to waste time processing the duplicate data. In one embodiment, the navigation system 36 initiates a request for weather information data from the telematics unit 28. The request can be for all U.S. data, specific longitudinal area data, etc., so that the telematics unit 28 relays weather data for the requested geographic area to navigation system 36. This reduces the number of tasks system 36 must perform, and also makes efficient use of the bandwidth available in the communication channel between the system 36 and the telematics unit 28.

In the present embodiment, the transmitter 24, the satellite 26, and the telematics unit 28 are part of a satellite radio broadcasting system (e.g., XM Satellite Radio). It will be understood that the weather data 22 from the weather content provider 20 can be broadcast via any suitable information broadcast system (e.g., FM radio, AM radio, or the like), and is not limited to the satellite radio broadcast system illustrated in FIG. 1. The weather data can comprise weather conditions, road conditions, specific hazards, weather warnings, weather forecasts, etc.

Figure 6:
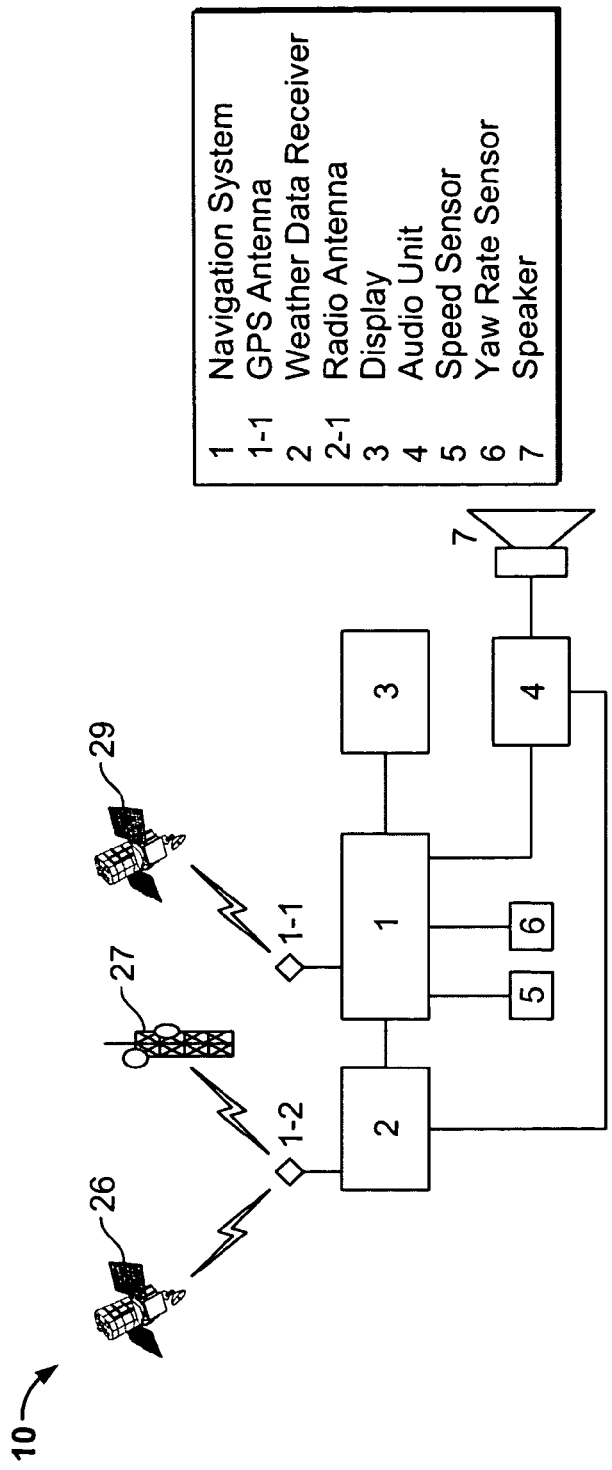
FIG. 6 is a block diagram of another embodiment of a weather information system.

With reference to FIG. 6, in another embodiment, the weather information system 10 includes a vehicle navigation system 1 that comprises a global positioning system (GPS) antenna 1-1 to receive signals from the GPS satellites 29. The navigation system 1 is connected to a vehicle speed sensor 5 and a yaw-rate sensor 6 that are used to facilitate location recognition on the map shown in the display unit 3. The navigation system 26 is also connected to a radio receiver 2, which receives data broadcasts (including weather data) from AM/FM radio stations 27, or satellite radio satellites 26, and other broadcasting systems that are capable of sending weather data and alerts. The navigation system 26 is also connected to a display unit 3 and audio unit 4 that transmits audio signals to a speaker 7.

Figure 8:
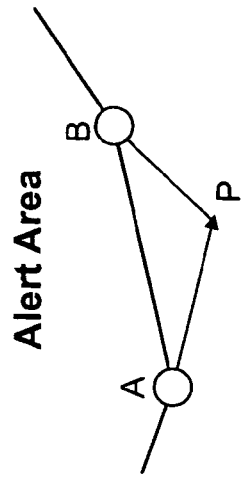
FIGS. 7 and 8 illustrate a method of determining whether a vehicle is in a weather alert area.
Figure 7:
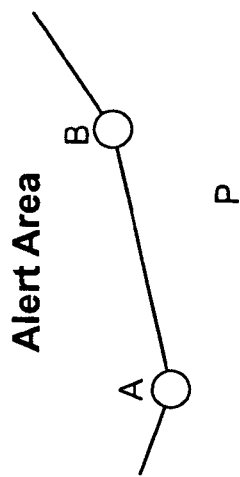

The system for delivering weather alerts to a vehicle first figures out whether a given weather alert pertains to the vehicle location. Typically, the weather alerts are generated and specific to a defined geographic area. In one embodiment, wherein the area to which the weather alert pertains is a large geographic region—namely a county—the system 1 receives and/or converts such data as a longitude and latitude data for the county border and defines a corresponding area on the digital map. In another embodiment, shown in FIGS. 7 and 8, when the border is defined from point A to point B, and the current vehicle position is point P, a calculation is used to determine whether the vehicle is within or close to the alert area. The calculated value equals the domain or area of the triangle (defined by points A, B, and P) divided by the length of AB. If this calculated value is less than a set number C, the system judges that the vehicle is in or close to the alert area, and then displays an alert on display unit 3 and/or transmits an audio warning via audio unit 4 and speaker 7.

In yet another embodiment, vehicle velocity vectors (speed and direction) $v(P_n)$ from multiple points are used to determine whether a vehicle will enter an area of alert. For example, as shown in FIGS. 9-11, the velocity vector $V(P_n)$ at point P can be defined as the average of the last four velocity vectors:

$$V(P_n)=[v(P_n)+v(P_{n-1})+v(P_{n-2})+v(P_{n-3})]/4.$$

The calculated velocity vector $V(P_n)$ is used to determine whether the vehicle will cross the border into the area of alert within a predetermined amount of time (e.g., 30 minutes). In another approach, the calculated velocity vector $V(P_n)$ is used to determine whether the vehicle will leave the area of alert within the predetermined amount of time.

In accordance with one aspect of the embodiments described herein, the weather data may be broadcasted as a multi-longitudinal data array. An advantage of using a longitudinal-based array is that it is shorter than a latitude-based array, and therefore may take less time to be broadcast to a vehicle. It should be appreciated that as the broadcast time increases, there is an increased possibility that the broadcasted data signal will be interrupted by physical impediments such as bridges, buildings, etc. Interrupted data signals result in broken data, which may be deemed useless and thrown away by receiver units.

Figure 2:
FIG. 2 illustrates a method of creating a longitudinal data array set.
Figure 3:
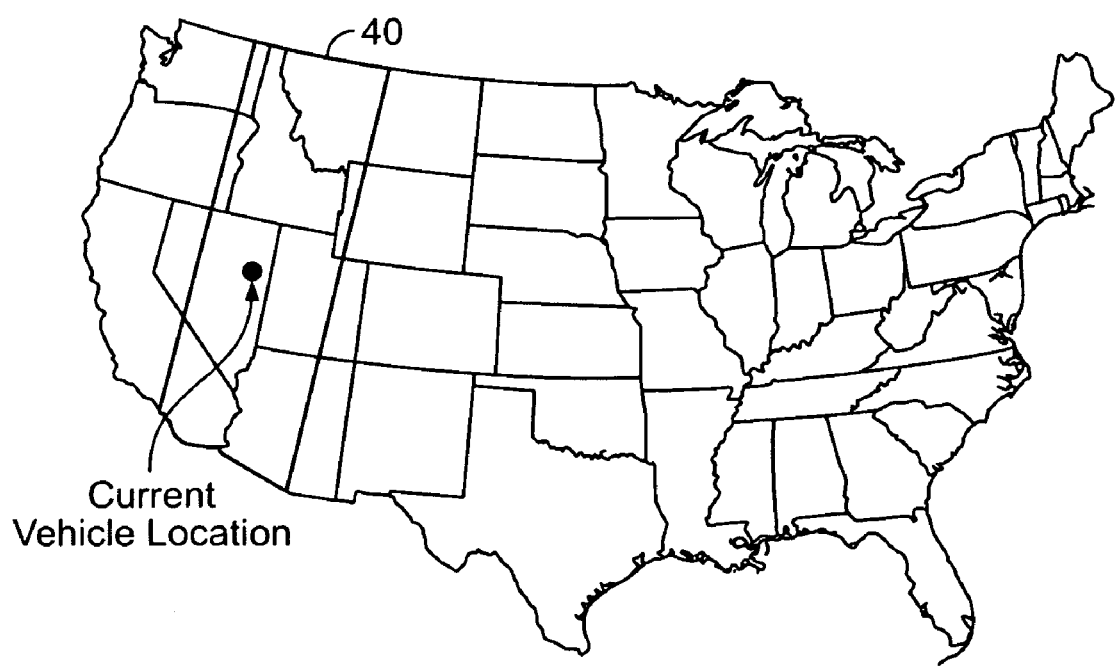
FIG. 3 illustrates a method of filtering weather data based on the current location of a vehicle.

The weather data can be referenced to a grid covering the United States of America. Some portions of the weather data can be delivered in columns that are equally spaced in longitude across the U.S., as shown in FIGS. 2 and 3, while other portions of the weather data can be point specific. It will be understood however, that geo-referencing of point data is related to the grid that is defined by column and row spacing of the grid data.

Figure 4:
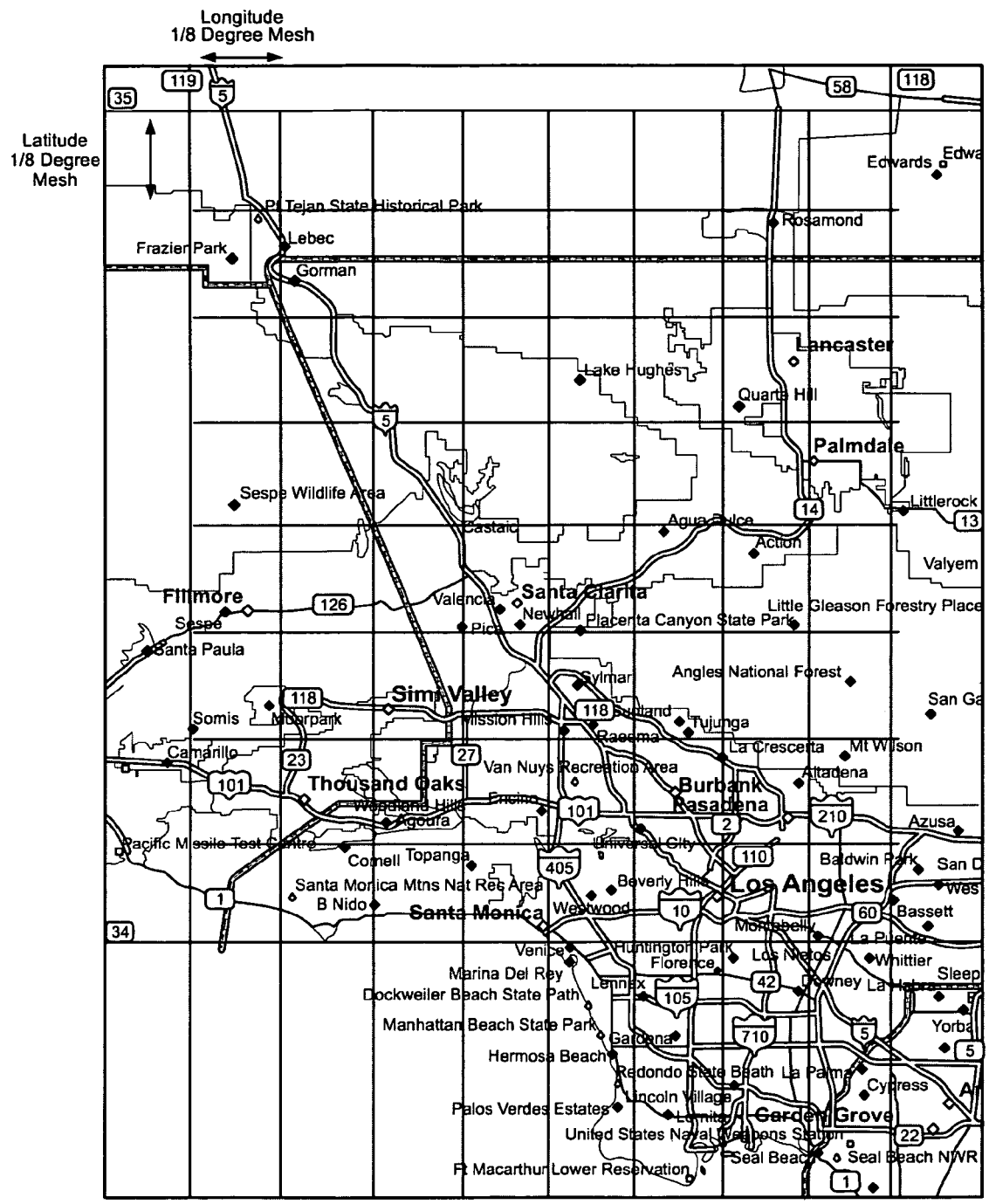
FIG. 4 illustrates a method of creating a longitudinal data array set.
Figure 23:
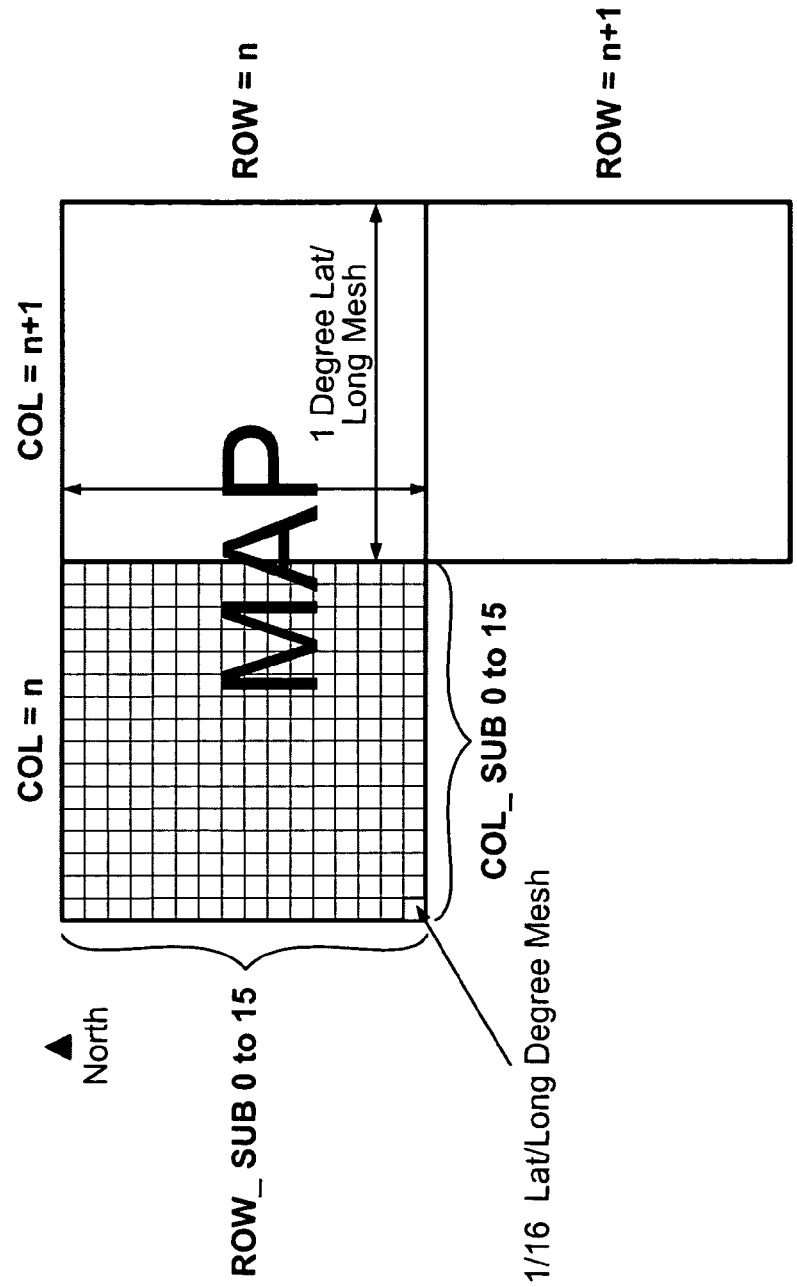
FIG. 23 illustrates a method of creating a mesh data array set on a map.

In one embodiment, shown in FIG. 4, the continental U.S. is divided into a grid of cells, wherein each cell spans ⅛ (0.125) degree in both directions. Each cell is generally referenced by its corner or center location. Representing weather data/alerts within a mesh that is latitude ⅛ degree by longitude ⅛ degree facilitates the handling of weather data by navigation system 36 of the vehicle, particularly since the system 36 typically utilizes a similar latitude/longitude data system to monitor and represent the geographic position of the vehicle. In another embodiment, the geographic region of interest is divided into a grid of cells, wherein each cell spans ¼ degree in both directions. In yet another embodiment, the geographic region of interest is divided into a grid of cells, wherein each cell spans 1/16 degree in both directions. Further embodiments and details for dividing a geographic region into a mesh or array of cells are illustrated in FIG. 23.

Figure 5:
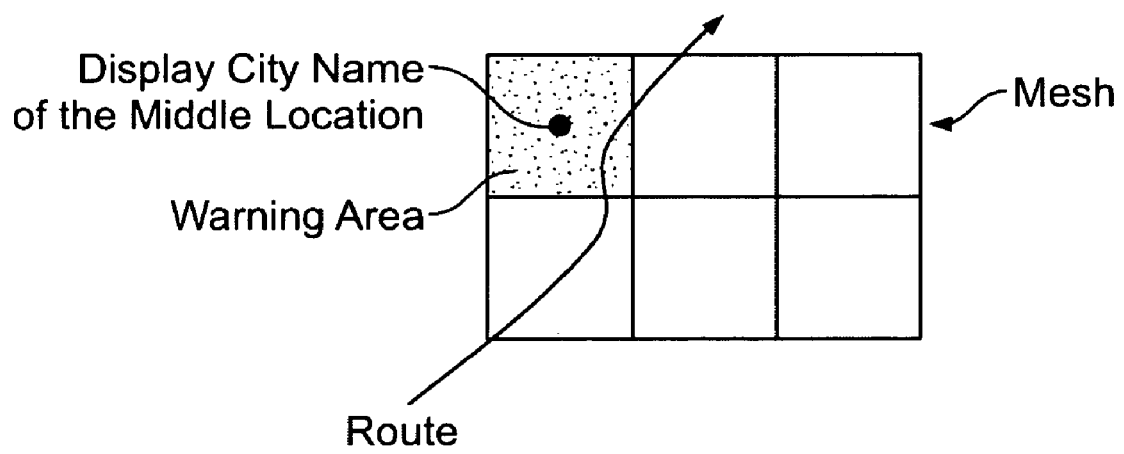
FIG. 5 illustrates a method of displaying traffic warnings on a geographic mesh.

In one embodiment, shown in FIG. 3, the vehicle telematics unit 28 filters the weather data by longitude, so that only weather data in area 40 is sent from the telematics unit 28 to the navigation system 36 of the vehicle. A predefined longitude data array set can be used for this filtering. In another embodiment, the vehicle telematics unit 28 relays the received weather data to the navigation system 36, which filters the received weather data by the longitude of region to which the weather data applies. The name of the city or region to which the weather data can be displayed in the middle of the warning area on the navigation system display unit, as shown in FIG. 5.

In one embodiment, each mesh cell comprises one byte of data, thereby making efficient use of the available broadcast bandwidth. In another embodiment, each mesh cell comprises less than one byte of data. An advantage of mesh cells having small data sizes is that it may reduce the amount of power and/or memory the navigation system uses to handle the weather data. Basic weather condition data (e.g., rain, snow, etc.) can be encoded with less than a single byte of data.

Weather conditions are determined from any number of known suitable sources, such as Doppler radars, Geostationary Operational Environmental Satellite Program (GOES) weather satellites, surface observation sites, etc. In one embodiment, the mesh cells are transmitted in column major order, and a separate message is used for each column. A message header is preferably sent at the start of each column, wherein the header contains the column number. For example, the first cell in the data is for 50N, while the second is for 49.875N, and so on.

Figure 18:
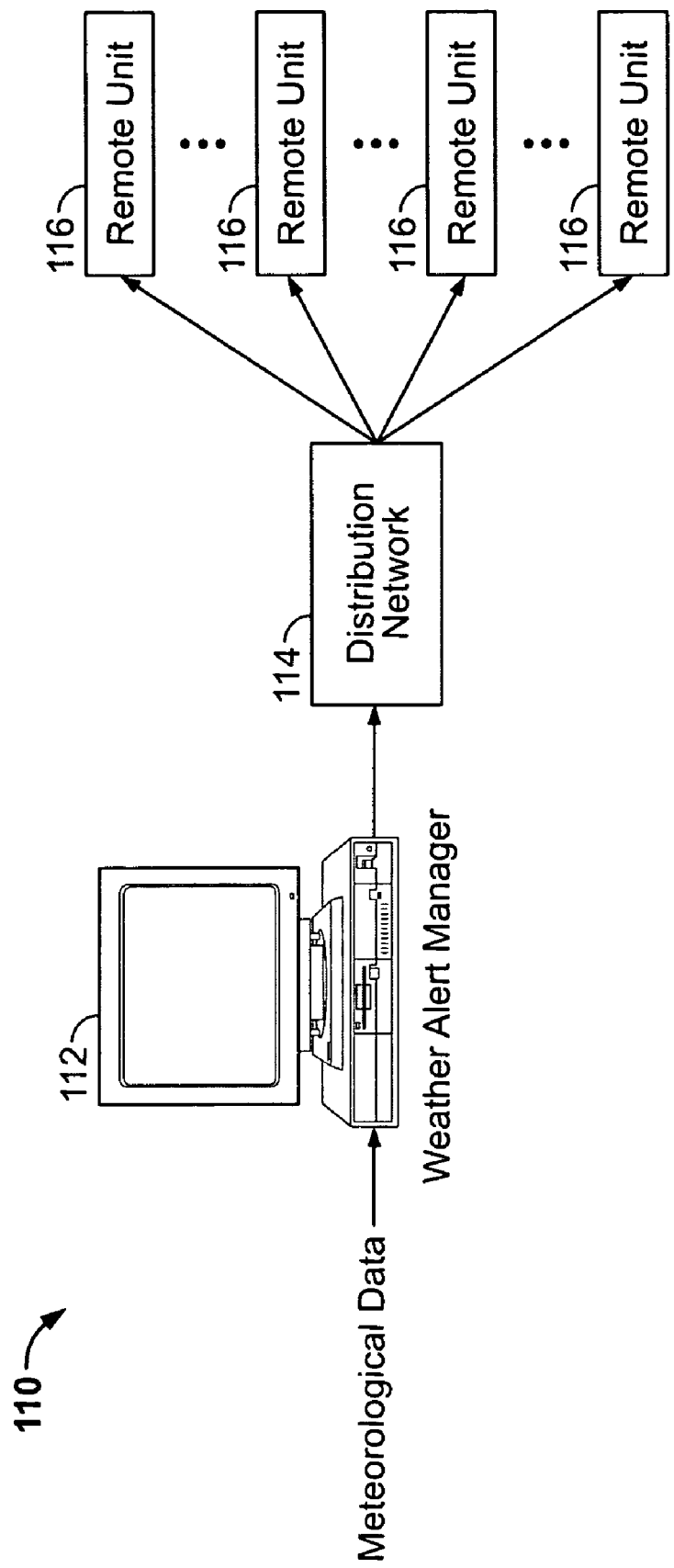
FIG. 18 is a schematic illustration of one embodiment of a system for distributing real-time site specific weather information.

FIG. 18 illustrates one embodiment of a system 110 for providing real-time site specific weather information. The system 110 comprises a weather alert manager 112, a distribution network 114, and a plurality of remote units 116. Briefly stated, the system 110 receives meteorological data including weather information for a geographic area, which is relevant to one or more of the remote units 116. The meteorological data is processed to generate storm profiles for the storms within the meteorological data. The storm profiles are distributed to the respective remote units 116 by the distribution network 114. In response to the storm profiles, the remote units 116 provide weather information that is relevant to a specific geographic area predefined for each remote unit 116.

Figure 19:
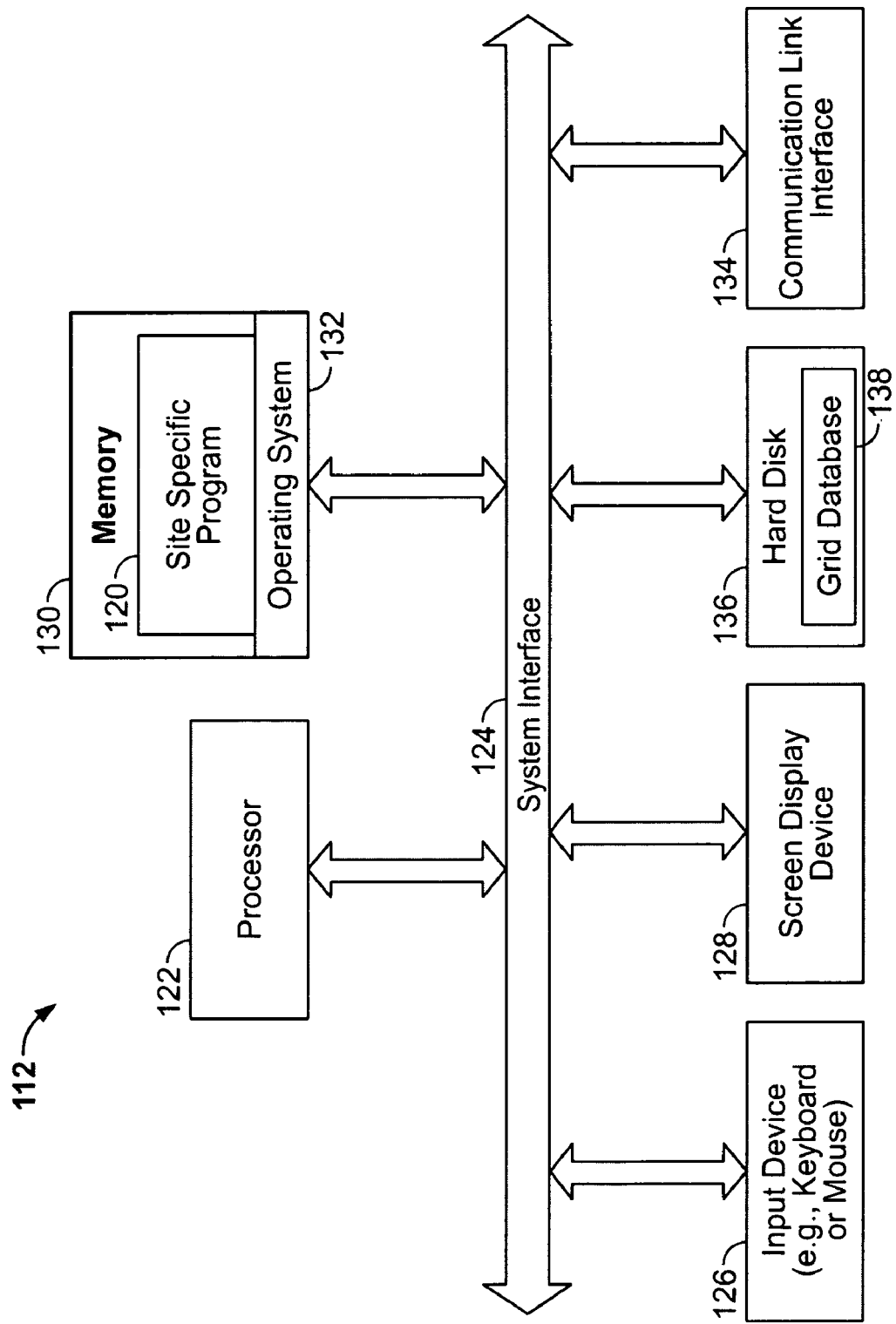
FIG. 19 is a block diagram illustrating the architecture and functionality of the weather alert manager of the system of FIG. 18.

With reference to FIG. 19, in one embodiment, the weather alert manager 112 includes a site specific program 120. As shown, the weather alert manager 112 can be configured as a special purpose computer or other apparatus suitable for executing the program code embodied within the site specific program so as to impart the functionality described herein. The weather alert manager 112 further includes a processor 122 that can communicate with the other elements within the weather alert manager 112 via system interface 124. An input device 126, for example, a keyboard or mouse, is used to enter data from the user, and a screen display device 128, for example, a monitor, is used to communicate data to the user. A memory 130 within the weather alert manager 112 contains the site specific program 120 for imparting the functions described herein. In addition, the memory 130 includes a conventional operating system 132 that communicates with the site specific program 120 and enables execution of the site specific program 120 by the processor 122. A communication link interface 134 is provided for interfacing the weather alert manager 112 with other related systems for purposes such as receiving meteorological data or transmitting storm profiles to the distribution network 114. Lastly, a hard disk 136 is provided as a nonvolatile memory for storing information such as a grid database 138 as described in more detail below.

The weather alert manager 112 can be configured to receive meteorological data via communication link interface 134, or alternatively, via manual entry through input device 126. The meteorological data may be provided by a variety of sources, but preferably comprises NexRad attribute data. NexRad is a weather service provided by the National Weather Service (NWS), which employs a system of high powered radars scattered throughout the country that collect data that is synthesized for distribution to subscribers. The NexRad attribute data is distributed by several providers that can communicate the data via a satellite downlink or over a communication network connection such as a telephone line. Several of the NexRad providers are: Alden Electronics, Westborough, Mass., USA; UNISYS, Philadelphia, Pa., USA; and Weather Services International (WSI) Corporation, Billerica, Mass., USA. The NexRad attributes data provides subscribers with detailed information concerning storms detected by the NexRad radar sites. The NexRad attribute data may include the information in FIG. 20 for each storm.

The meteorological data can comprise manually entered information regarding a storm. Preferably, this information is provided by the emergency management agency (EMA) or another similar entity such as a local 911 service charged with weather warnings. Examples of factors that may be considered in such circumstances include the terrain of the local area or the presence of high risk structures in the path of a storm, such as a school or shopping mall.

The meteorological data received by the weather alert manager 112 is processed by the site specific program 120. Particularly, the site specific program 120 performs storm tracking functions on the storms that are identified by the meteorological data, and that are within the geographic region of interest. Systems capable of performing storm tracking functions, such as those required in the present system, which are commercially available include the NexTrac system by Baron Services, Inc., Alabama, USA, or Storm Pro by Kavouras, Minnesota, USA.

There are several possible methods of performing storm tracking operations. A first exemplary method involves gathering historical data of a particular storm so that the direction and speed of the storm can be derived from the location of the storm at two discrete points in time that are recorded in the historical data. A direction of the storm can then be determined by a direction vector passing through the two locations of the storm. The speed of the storm can be determined from the distance between the two points and the time the storm took to travel between the two points. From the direction and speed, the location of the storm at some future point in time can be mapped out within an acceptable degree of accuracy. A second exemplary method includes retrieving the NexRad attributes $FCST_{13}$ ANGLE and $FCST_{13}$ MVMT, and then calculating the position of the storm after a predefined period of time based upon these attributes, as described in detail below.

Initially, the NexRad attributes RANGE and AZ are utilized to determine a current x coordinate range and a current y coordinate range for the storm with respect to the NexRad radar site that is tracking the storm. The x and y coordinate ranges can then be utilized with the latitude and longitude coordinates of the NexRad radar site to determine a true location of the storm in latitude and longitude measurements. The latitude and longitude of the storm can be combined with the NexRad attributes FCST_ANGLE (i.e., forecasted direction) and FCST_MVMT (i.e., forecasted speed) to derive a position of the storm after a predetermined period of time.

In addition to determining a future position of the storm, the storm tracking function includes tracking the width and fan-out of the storm. The width can be determined from the NexRad attributes as described above, and the fan-out is user defined. For purposes of the present disclosure, the fan-out of a storm is the rate at which the storm track widens from the base of the storm to the end of the track. The fan-out is an error factor that allows the future path of the storm to be determined with a greater tolerance. That is, the geographic area over which a storm may travel is more likely to be within a predicted path that accounts for a widening of the storm as it moves, such as in a range of around ten percent. The fan-out can be varied between two instances of the storm tracking operation for the same storm to create qualifiers that indicate the likelihood that the storm will affect a particular cell. These qualifiers are referred to hereafter as presence qualifiers. As an example, a storm tracking operation performed on a storm with about ten percent fan-out may result in ten cells that the storm will "probably" cross. If the storm tracking operation were performed a second time with a fan-out of about twenty percent, then the results may include twenty or more cells that the storm may "possibly" cross.

In one embodiment, the site specific program 120 combines the storm tracking information with a geographic grid to determine which location(s) within the geographic grid are affected by the storm. The geographic grid comprises a geographic region that is divided into a plurality of cells that are individually identified by a unique identification number. Each cell preferably comprises at least one latitude coordinate and one longitude coordinate, though the size of the cells can be defined by the user. By comparing the coordinates defining the predicted path of the storm to the geographic grid on a cell-by-cell basis, each cell within the grid that is affected by the storm can be identified. Furthermore, by running multiple instances of the storm tracking with different fan-out settings, presence qualifiers can be determined for the identified cells that the storm is currently crossing, probably approaching, or possibly approaching.

The site specific program 120 generates a storm profile for the storms identified in the meteorological data. The storm profiles generated by the site specific program 120 preferably include a storm type identifier, a severity indicator, and a list of cell numbers and associated presence qualifiers such as "in this cell," "possibly approaching this cell," or "probably approaching this cell." The storm identifier is provided by the NexRad attribute ID, the severity indicator is either manually entered by the EMA or automatically generated from one or more of the NexRad attributes, and the cell numbers and presence qualifiers are determined as described above. A data structure comprising a storm profile may appear as shown in FIG. 21. Accordingly, a storm profile is a relatively small amount of data that can be transmitted as a serial bit stream to the remote units 116 with low overhead on the part of the distribution network 114.

The distribution network 114 is configured to deliver the storm profiles to the respective remote units 116. Because the storm profiles require so little bandwidth for transmission to the remote units, updated storm profiles information can be sent out to subscribers frequently to ensure the weather information is current and up-to-date.

Preferably, the storm profiles and storm-related messages are generically broadcast to the remote units 116. Upon receiving a broadcast storm-related message, the remote unit 116 in a vehicle determines whether the message is applicable to the vehicle (e.g., whether the storm is within a predetermined distance of the current location of the vehicle or route to a destination). In other words, vehicles within broadcast range of the distribution network 114 will receive the storm profile broadcasts. Each vehicle, rather than the server or distribution network 114, decides whether the broadcast is appropriate or applicable to the vehicle.

In an alternative embodiment, the storm profiles are distributed according to an address integrated in the protocol overhead or the storm profile itself such as in an address field so that the remote units only respond to storm profiles that particularly identify cells that are associated with that remote unit 116. This can be accomplished by maintaining an end user database at the weather alert manager 112 that associates each end user with one or more of the cells. Thus, by cross referencing the cell numbers in a profile to a list of end users with associated cells, the specific end users that should be sent a storm profile can be identified. By identifying the end user, the remote unit 116 associated with that end user may be identified. The profiles may then be sent to the end user directly in a point-to-point communication utilizing the address.

In yet another embodiment, if the remote units 116 are configured to be responsive to specific address(es), then the profiles may be broadcast to all the remote units 114. The addresses in this case may be merely the cell numbers, and thereby, eliminate the need to provide a special address field to the data structure comprising the storm profile. The end user database may also identify how the profile is to be sent to the subscriber (e.g., a cellular phone call with recorded message or a pager with an alpha numeric message).

The distribution network 114 can be implemented by a variety of different communication mediums such as, but not limited to, wireless, cable television, pager, land-line telephone, satellite, etc. This flexibility in the method by which the storm profiles are delivered by the distribution network is advantageous because the method enables the subscriber to choose the most convenient method of delivering the site specific weather information of the present invention. The communication medium chosen may be based upon pricing tariffs, Federal Communications Commission (FCC) regulations, available technology, or the configuration of the remote unit (as described below). An example of one configuration for the distribution network 114 is a wireless network that initiates a call based upon a number (i.e., address) that the weather alert manager 112 retrieved from a subscriber database. The wireless network then makes a call to the remote unit 116 associated with that wireless telephone number for sending a storm profile to the remote unit 116, which processes the information for presentation to the subscriber in real-time.

The remote unit 116 is configured to receive a storm profile and respond thereto by providing audio and/or visual indicators that convey relevant storm information such as the type of storm, the severity of the storm, and the relevance of the storm with regard to the location of the remote unit 116. The remote unit 116 can be located throughout the geographic region covered by the geographic grid utilized by the weather alert manager 112. The remote units 116 can be located in homes, a public facilities (e.g., shopping malls or golf courses), mobile vehicles (e.g., automobiles, buses, taxicabs, plane, etc.), or the like.

Figure 22:
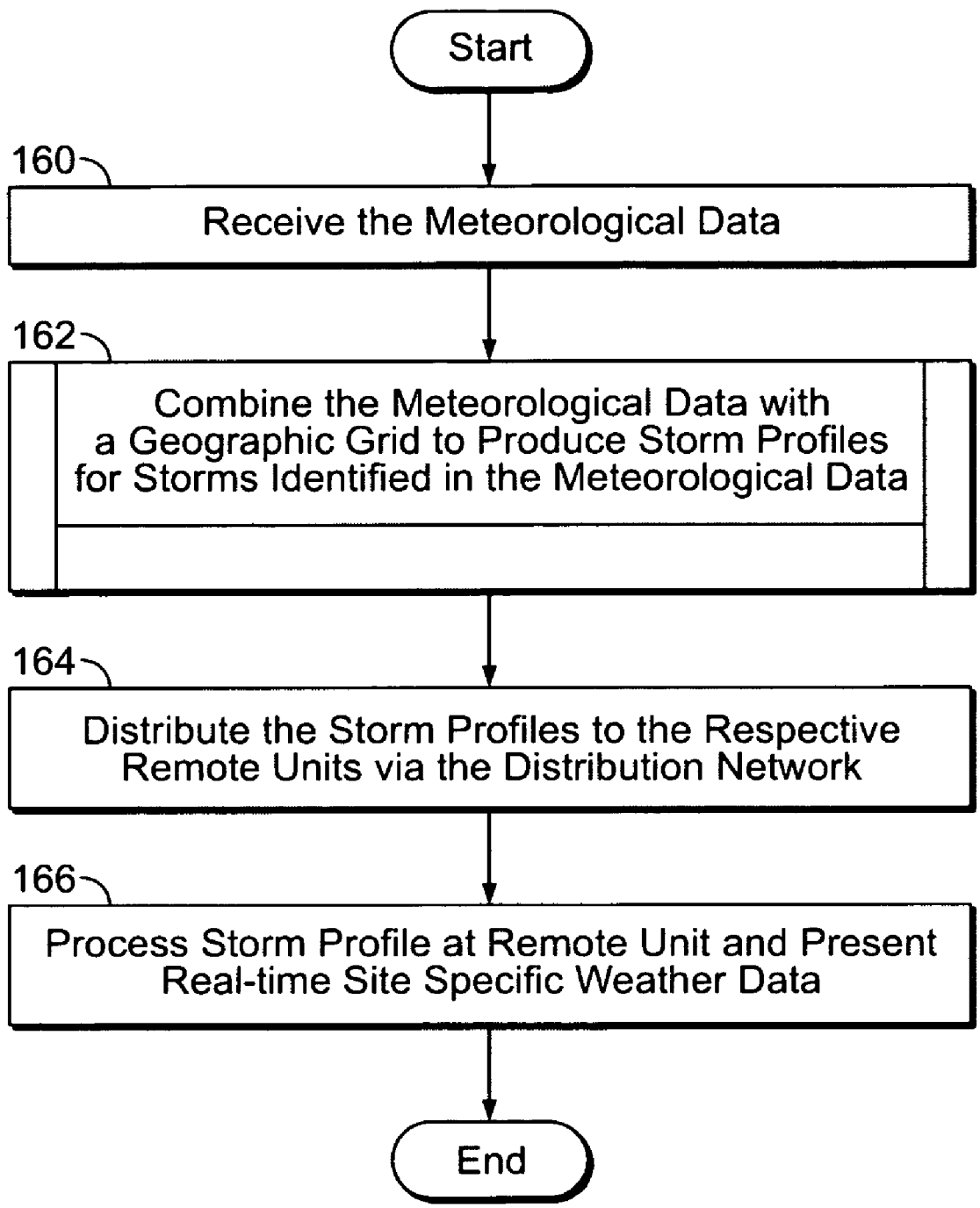
FIG. 22 is a flowchart of the operation of the system of FIG. 18.

With reference to FIG. 22, the weather alert manager 112 initially receives meteorological data including weather information defining storms within a relevant geographical area (e.g., North America), as indicated by block 160. At block 162, the meteorological data is combined with a geographic grid to produce storm profiles for the storms identified in the meteorological data. Next, the storm profiles are distributed to the remote units 116 via the distribution network 114, as indicated by block 164. The storm profiles are processed at the respective remote units 116 for presentation of real-time site specific weather information, as indicated by block 166.

In accordance with another aspect of the embodiments described herein, four types of weather warnings are processed, encoded, and delivered to a vehicle navigation system by the weather information system—namely, advisories, watches, warnings, and road closings. Advisories, watches, and warnings are typically derived from bulletins from the National Weather Service (NWS). At least four types or categories of weather warnings are possible. The first type of situation occurs when the vehicle is currently in the warning area. The second situation occurs when the destination is in the warning area. The third situation occurs when the planned travel route of the vehicle is located in or passes through at least one warning area. The fourth exemplary situation is when the vehicle is located close to at least one warning area.

Figure 16:
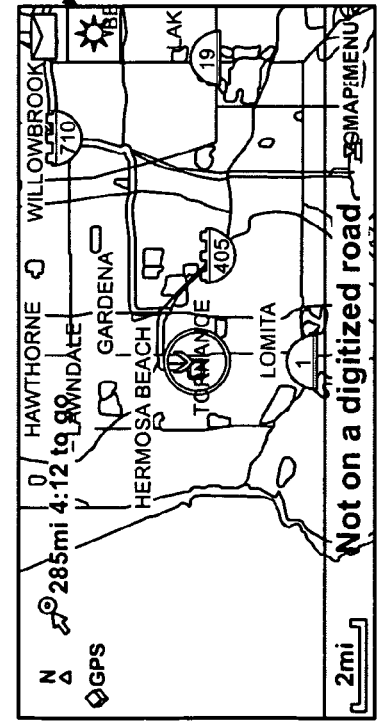
FIG. 16 is yet another embodiment of a digital map display for displaying weather data.

In one embodiment, weather warnings are encoded according to the numeric codes in FIG. 13. For example, the presence of a tornado watch in a given cell is represented with a 0, while the presence of a winter storm watch is represented with a 7, etc. The weather information system preferably allows the user to specify his/her preferences in terms of the criteria the system implements in delivering weather warning to the user. For example, in one embodiment, the system is configured to transmit a number code 7 to the user if a winter storm watch is in effect in the current user location. The number code 7 is received by the telematics unit 28 and is sent to the navigation system 36, which in turn displays a pop up message, plays an audio message, or performs a similar action to warn the driver. In one embodiment, the navigation system 36 displays a flashing icon, as shown in FIG. 16.

Weather warnings are not typically contained in the mesh data, since weather warnings do not always exist or occur (i.e., bits of data in the mesh cell data is not allocated to weather warnings). This allows for more efficient utilization of the available broadcast bandwidth. However, when the weather warnings are broadcast, the warning location data is linked to the mesh location, allowing for the navigation system to process and display the weather warning on the display unit easier.

In accordance with another aspect of the embodiments described herein, there is provided a mesh data system for a vehicle navigation system that is not limited to current weather data, but supports weather forecast data. Weather forecast data for locations can be defined relative to mesh grids, thereby making possible the encoding and sending of weather forecast data, such as temperature, general conditions, and the probability of precipitation. In one embodiment, weather forecast conditions are encoded in a field that is 5 bits in size, according to the table provided in FIG. 12. For example, a forecast calling for fair conditions is represented by a 1, while a partly cloudy forecast is represented by a 2, while a forecast for thunderstorms is represented by a 20, etc. A format header number can be used to indicate how many hours later the weather forecast applies, thereby allowing the user to know when rain will occur in a certain place or what the weather will be when the user arrives at a destination.

In one application, the mesh data covers all of the U.S., except Hawaii and Alaska. Since the mesh data is linked to particular geographic regions or cells defined by the grid defined by the grid, as opposed to being linked to roads or cities, there is no need to update the data format when new roads appear, etc. The weather data encoding schemes described herein are exemplary and are not intended to limit the scope of the present invention. It will be understood that the weather data encoding, broadcasting, and/or filtering methods described herein can be modified to make efficient use of the bandwidth available for data transmission. For example, in one embodiment, shown in FIG. 1, the satellite radio system broadcasts weather data in one minute cycle updates throughout the U.S., thereby accommodating drivers who need or want weather information as soon as possible after the ignition of the vehicle is turned on.

In accordance with another aspect of the embodiments described herein, there is provided a real time information system that collects, encodes, and delivers regionally-relevant traffic and weather information to vehicles via an information broadcast system, such as satellite radio or the like. The system can optionally deliver other regionally-relevant information, such as points of interests, etc.

In one embodiment, weather information/data is encoded into a traffic data format and incorporated into a traffic data stream, thereby avoiding having to use two separate formats to broadcast weather and traffic data. Further detail regarding traffic data formats is provided in U.S. patent application Ser. No. 11/093,919, filed Mar. 29, 2005, titled Display Method and System for a Vehicle Navigation System, and also in U.S. patent application Ser. No. 11/100,868, filed Apr. 6, 2005, titled Method and System for Controlling the Exchange of Vehicle Related Messages, the disclosures of both of which are incorporated in their entireties herein by reference.

In accordance with yet another aspect of the embodiments described herein, there is provided a system and method for formatting the weather data that is broadcast to a receiver or vehicle telematics unit inside the vehicle, and then ultimately transmitted to the navigation system of the vehicle. Again, the weather data is preferably filtered by the telematics unit to remove duplicate or geographically irrelevant data. The weather data can be formatted in any of ways, such as in Mesh Weather format, Warning Message/Warning ID format, and Mesh Radar/Satellite format, as shown in FIG. 24. In one embodiment, shown in FIGS. 25A-25E, the Mesh Weather format is used for the weather data that is broadcast to the vehicle telematics units. In another embodiment, shown in FIGS. 26A-26G, the Warning Message/Warning ID format is used for the weather data that is broadcast to the vehicle telematics units. In yet another embodiment, shown in FIGS. 27A-27H, the Warning Mesh Radar/Satellite format is used for the weather data that is broadcast to the vehicle telematics units. Each of the above mentioned formats only require about 8 bits or less of data to transmit weather information (current and/or forecasted weather data). It will be understood that the total number of bits needed to broadcast the weather data can vary depending on the particular application and requirements of the weather information system.

Figure 14:
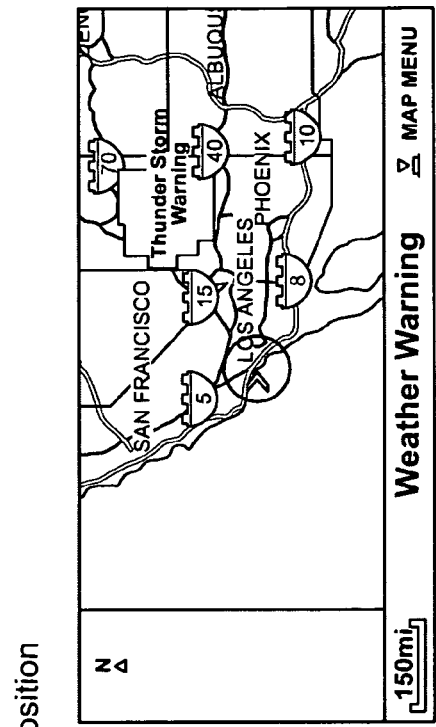
FIG. 14 is one embodiment of a digital map display for displaying weather data.
Figure 15:
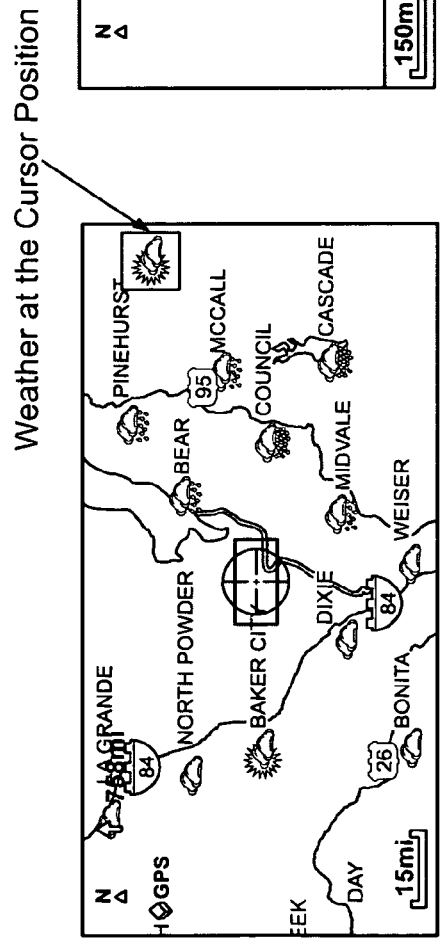
FIG. 15 is another embodiment of a digital map display for displaying weather data.

In accordance with yet another aspect of the embodiments described herein, there is provided a vehicle navigation system that detects the current location of the vehicle, and that receives weather alerts within a predetermined distance of the current location (or that occur within the same geographic zone in which the vehicle is located or is traveling to). The navigation system typically comprises a digital map display for displaying the current location, direction, and speed of the vehicle, as well as weather information, as shown in FIGS. 14 and 15. The navigation system of the present embodiment can display weather data in text format, but can also summarize/coalesce and display weather conditions/information as weather icons, as shown in FIGS. 14 and 15.

In one embodiment, the navigation system receives encoded weather data, processes the received weather data, and displays the appropriate weather icons, thereby reducing the amount and pieces of information needed to convey weather conditions to the driver and vehicle occupants, and thereby avoiding crowded displays. A cluster of weather icons can further be coalesced into a smaller number of representative icons, preferably with some indication that the weather information has been condensed. The user can preferably select the representative icon(s) (e.g., by moving a cursor on the display unit of the navigation system) to obtain additional information regarding weather conditions summarized by the representative icon(s). In one embodiment, effects can be applied to the weather icons (e.g., flashing icons) to call the attention of the user to the particular weather conditions, as illustrated in FIG. 16. In another embodiment, various color schemes are used to represent weather conditions on a display map (e.g., blue is used to indicate rain). In yet another embodiment, the map displayed by the navigation system can be configured to resemble a weather radar map, or the like. In still another embodiment, auditory warnings are used along with the weather icons to provide weather warnings and alerts to the driver. In another embodiment, auditory warnings are used in lieu of weather icons to bring the attention of the user to weather conditions.

Figure 17:
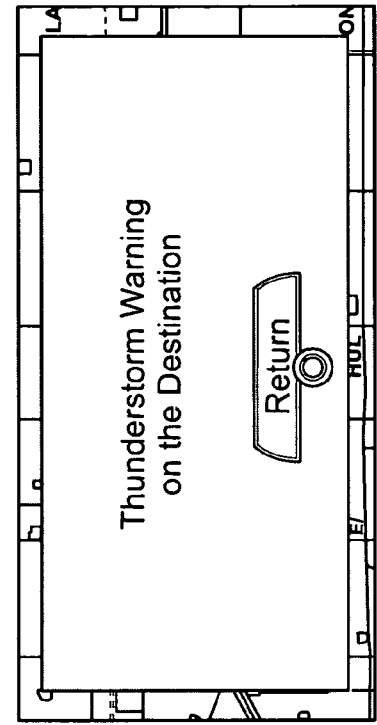
FIG. 17 is a an embodiment of a display with a radio short cut button.

In one embodiment, shown in FIG. 17, the navigation system displays a short cut button on the display that turns the car radio on. The navigation system preferably tunes the radio into a weather and news radio station broadcasting near the current location of the vehicle. In another embodiment, the car radio is automatically turned on when a weather alert is displayed.

In accordance with another aspect of the embodiments described herein, there is provided a system and method for efficiently sending weather-related information, warnings, and alerts to a vehicle over a limited broadcast bandwidth. As used herein, weather warning mesh refers to weather warning data, typically displayed on a map that is divided into and comprises a mesh pattern or matrix. The warning area mesh typically comprises a plurality of weather warning cells, wherein each cell is defined by longitudinal and latitudinal coordinates.

Figure 28A:
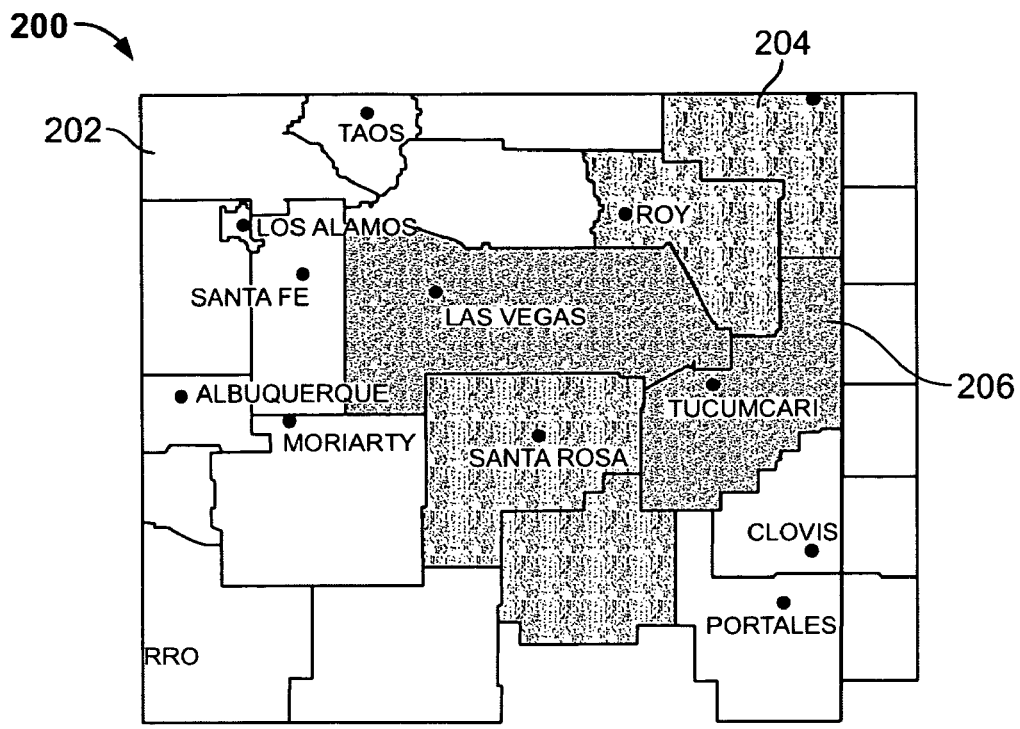
Figure 28B:
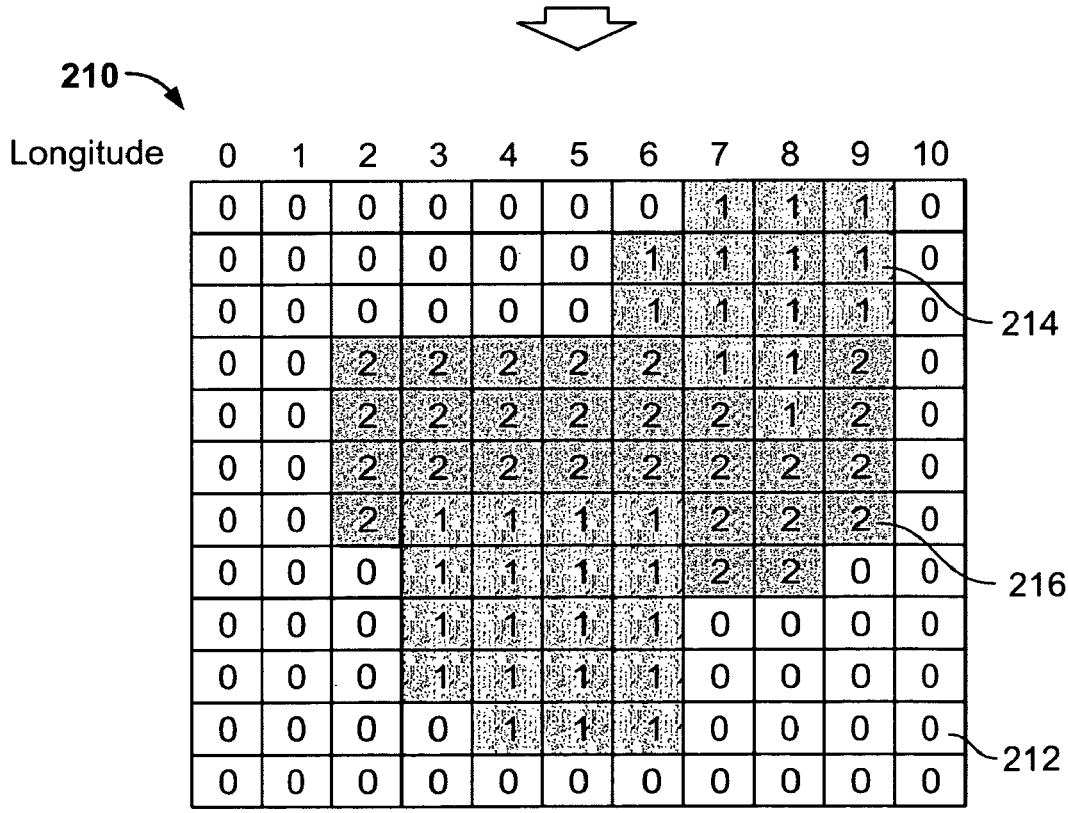

With reference to FIG. 28A, there is provided a map 200 of a region with color coded weather information. Map regions 202 that are of a first, light shade indicate regions for which there are no weather warnings/alerts. Map regions 204, 206 that are of darker shades indicate regions for which there exist weather warnings/alerts. With reference to FIG. 28B, the weather related information in map 200 can be presented as a weather warning mesh 210 by dividing the map into a plurality of weather warning cells 212, 214, 216. Cell 212 corresponds to an area for which there are no weather warnings. Cells 214, 216 correspond to areas for which there exist weather warnings or alerts.

In one embodiment, the weather warning mesh comprises weather data that is divided into a matrix by dividing a map every ⅛ (0.125) degree along the longitudinal and latitudinal axes, such that each cell spans ⅛ (0.125) degree. It will be understood that the map information can be divided at different intervals along the longitudinal and latitudinal axes (or other suitable spatial reference set) to generate the weather warning mesh. The intervals between divisions of the map into cells can be adjusted as needed depending on the application, geographic properties of the mapped region, etc.

As used herein, weather warning information refers to detailed weather-related information/data that is linked to certain cells of the weather warning mesh. Typically, a weather warning information packet or class is applicable to a plurality of cells. Rather than linking the detailed weather warning information to each cell via a detailed coordinate system that consumes a large amount of broadcast bandwidth resources, the embodiment described herein involves linking detailed weather warning information to the cells of the weather warning mesh by assigning a warning number to each cell. As used herein, warning number refers to an assigned number that serves as a link between a given weather warning cell and the detailed weather warning information for the particular class of the weather warning cell. The warning numbers function as a type of classification system for cells of the weather warning mesh. In one embodiment, cells having the same warning number receive the same weather warning information (e.g., a warning regarding a flood or thunderstorm watch until 9:00 pm).

With reference to FIG. 28C, in one embodiment, the weather warning information 220, 222 each comprises a warning number, a matching number (described in further detail below), information regarding how the weather warning information should be presented to the vehicle operator, and the substance of the weather warning information (e.g., flood warning in Santa Rosa until 9 PM this evening, or severe thunderstorm in Las Vegas until 9 PM this evening). When the "Pop up" field is set to 1, a pop-up message will be displayed on the display unit of the vehicle; when the "Pop up" field is set to 0, no pop-up message is displayed. When the "Blink" field is set to 1, a blinking icon is displayed on the display unit of the vehicle; when the "Blink" field is set to 0, no such blinking icon is displayed. As a result, the broadcasting side, rather than the receiving side, can control user-vehicle interface according to the importance of the warnings.

The weather warning information 220, 222 and the weather warning mesh 210 are periodically updated, so there may be multiple versions of the weather warning information and the weather warning mesh. As such, a matching number is assigned to both the weather warning information and the weather warning mesh to ensure that the weather warning information generated at one particular time matches up with the weather warning mesh generated at the same time. As used herein, matching number refers to the particular version or iteration of the weather warning information and/or the weather warning mesh. The matching numbers for the weather warning information and the weather warning mesh increase each time there is an update to the weather warning information and the weather warning mesh, respectively. In one embodiment, the broadcast warning data is updated at predetermined time intervals (e.g., every 5 minutes).

In an exemplary embodiment, the matching number range is from 0 to 255. After 255, the matching numbers return to 0 and go to 255 again, such that a particular matching number can be reused. The vehicle navigation system typically comprises a timer for keeping track of how long received warning data has been around. Old warning data (i.e., data that has been around longer than a predetermined amount of time) is preferably deleted. In one approach, old warning data is deleted if the next warning data is not received within a set time period (e.g., 15 or 30 minutes). As such, reusing the same matching number does not pose a problem because the previously used same matching number does not exist any longer in the vehicle navigation system.

With reference to FIGS. 28C and 28D, the weather warning information 220, 222 each has a matching number of five, as does the mesh broadcast data 230. As such, the weather warning information 220, 222 is applicable to and appropriate for the weather warning mesh 210 that is presented by the mesh broadcast data 230. The second line of the mesh broadcast data 230 is coded to generate a weather warning mesh wherein the column at Longitude 0 comprises twelve cells in a row having a warning number of 0. The fifth line of the mesh broadcast data 230 is coded to generate a column at Longitude 3 comprising three cells in a row having a warning number of 0, three cells in a row having a warning number of 2, four cells in a row having a warning number of 1, and two cells in a row having a warning number of 0. Representing weather warning data in this manner by broadcasting weather warning information and the weather warning mesh separately, greatly reduces broadcast bandwidth consumption. In one embodiment, each cell of the weather warning mesh is about 1 Byte in size and supports about 128 kinds of warnings at the same time. 1 bit of the 1 Byte can be used for the Repeat ON/OFF flag.

Figure 29:
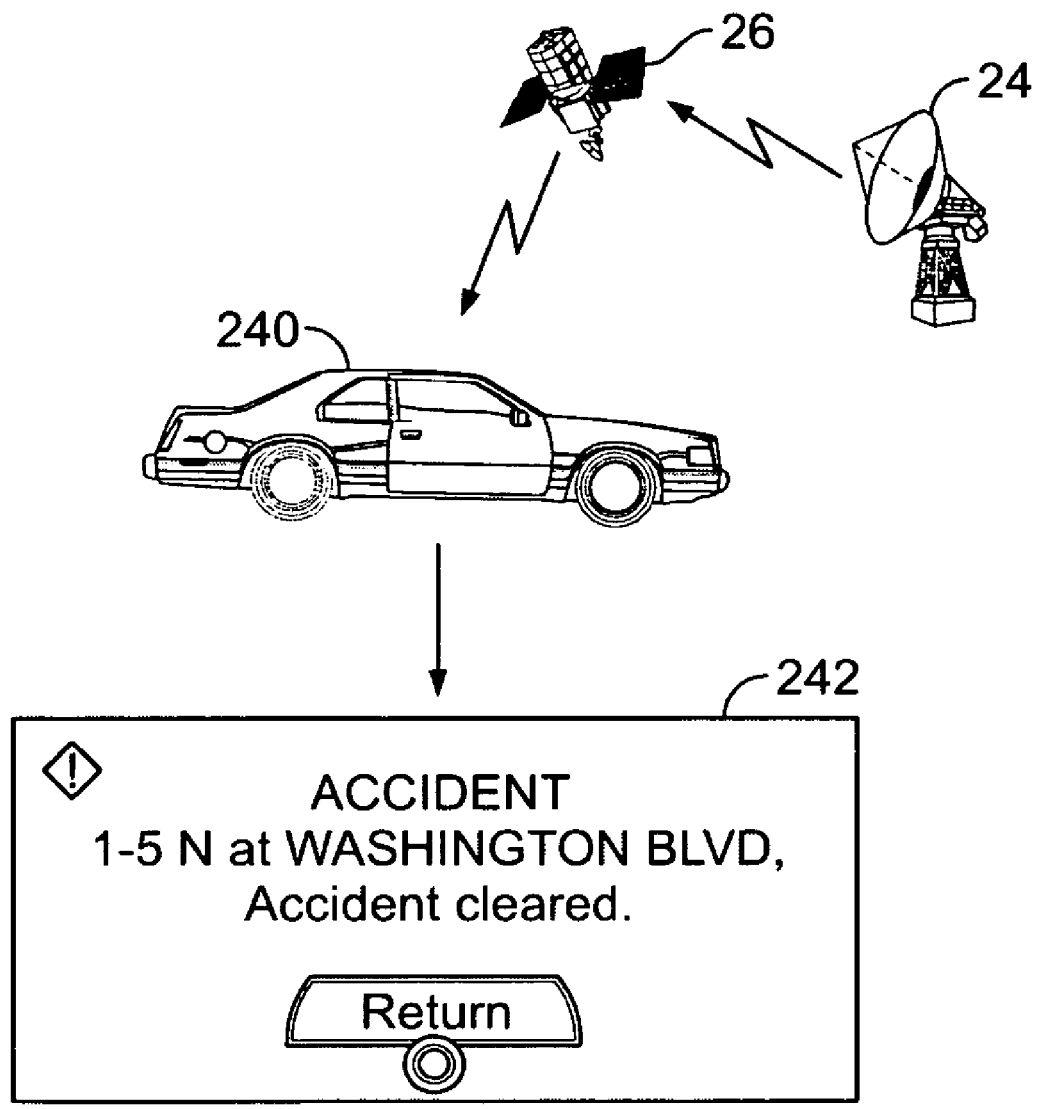
FIG. 29 illustrates an existing system for providing weather warnings to a vehicle.
Figure 30:
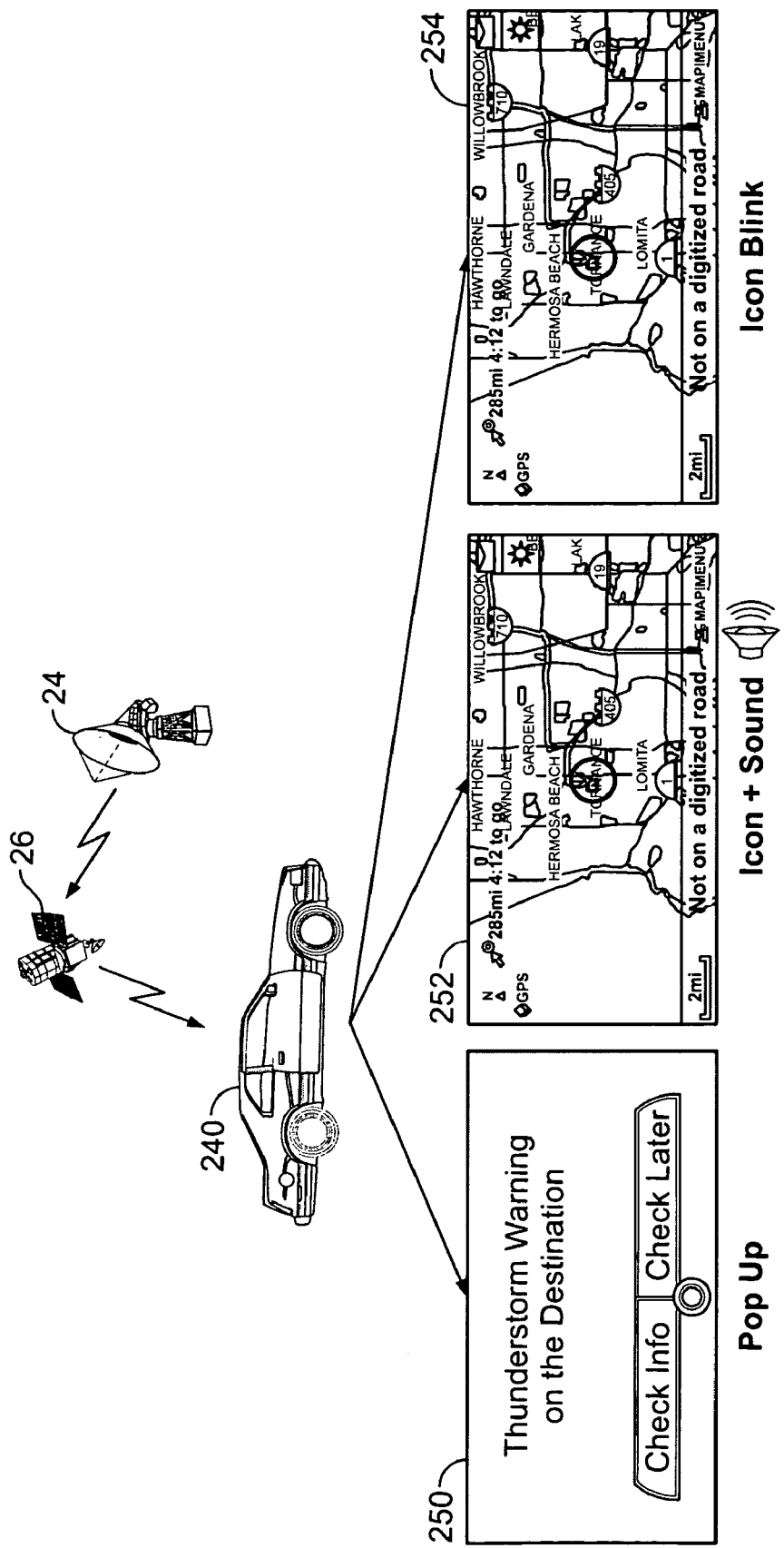
FIG. 30 illustrates a system for providing weather warnings to a vehicle by using the methodology illustrated in FIGS. 28A-28D.

FIG. 29 illustrates an existing traffic information system wherein a satellite radio transmitter 24 sends traffic information (e.g., traffic warnings or alerts) to a satellite 26, which in turn broadcasts the traffic information to a vehicle 240. Upon receiving the traffic information, the vehicle displays traffic incident information 242 on a display unit for the vehicle occupants. With reference to FIG. 30, there is provided a weather information system wherein the satellite radio transmitter 24 sends (a) weather warning information and (b) weather warning mesh separately, thereby reducing broadcast bandwidth consumption. The satellite 26 relays (a) weather warning information and (b) weather warning mesh to the vehicle 240. Because the relayed information can be represented in an efficient manner, as described above, existing, limited broadcast bandwidth may be utilized to communicate weather warnings and alerts in any number of improved ways. For example, the weather warning can be displayed as a pop-up message 250. Similarly, a weather alert 252 can be presented to the user as an icon on the display unit of the vehicle and a sound or recorded message over the audio system of the vehicle. Likewise, a weather alert 254 can be presented to the user as a blinking or flashing icon on the display unit of the vehicle.

Figure 31:
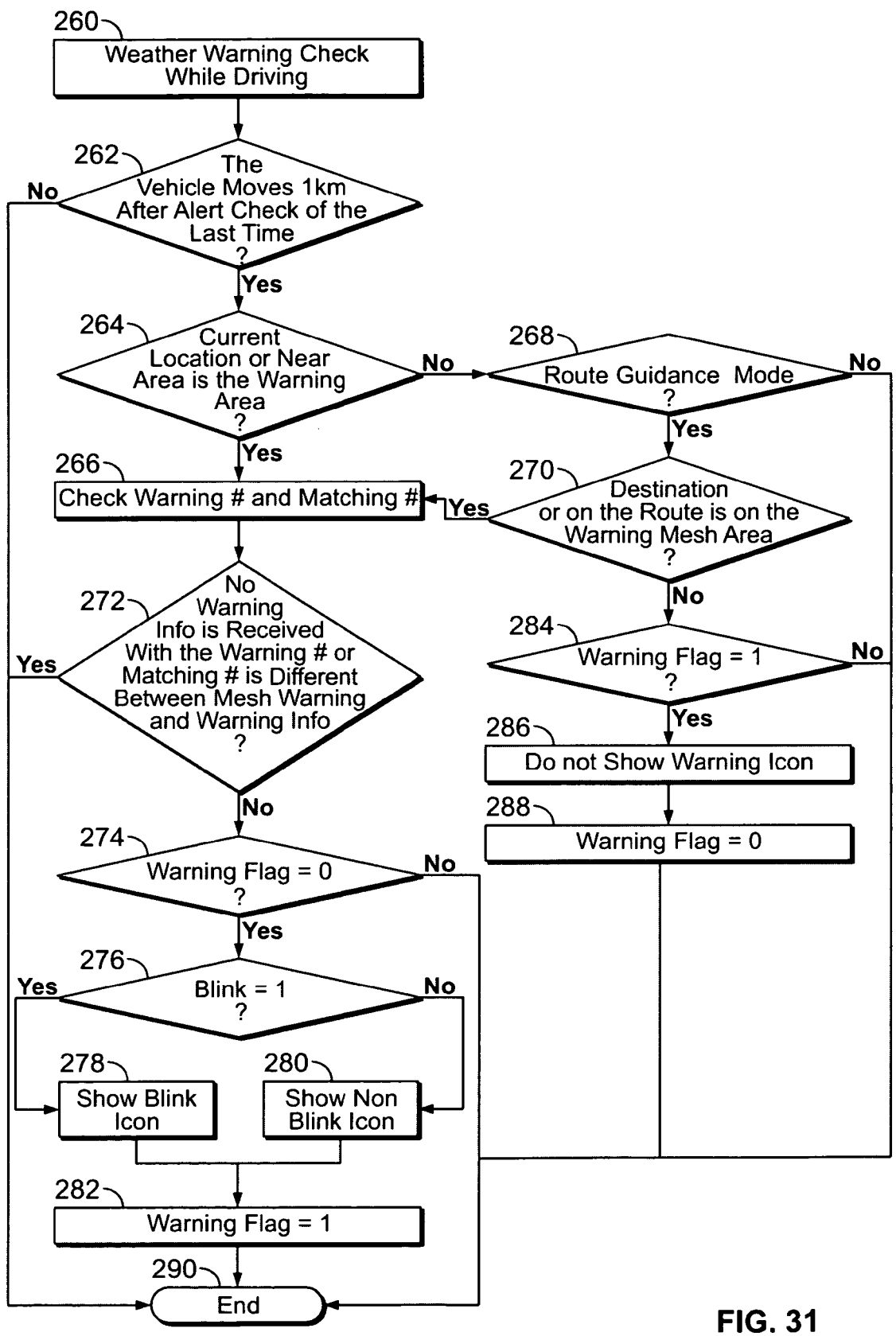
FIG. 31 is a flowchart of the operation of an embodiment of a system for providing weather warnings.

It will be understood that the present system and method for providing weather warnings and alerts are particularly suitable for implementation with a vehicle navigation system. With reference to FIG. 31, there is provided an exemplary method for providing weather information based on the current location of the vehicle. The method begins at step 260, where an onboard computer utilizes a telematics communication device to communicate with a remote weather information center to check to see if there is currently a weather warning or alert for the region in which the vehicle is or will be traveling. The weather warnings/alerts are preferably separately encoded as (a) weather warning information and (b) weather warning mesh, as explained above. At step 262, the onboard computer determines whether the vehicle has moved at least 1 km. If so, the onboard computer proceeds to step 264; otherwise, the onboard computer proceeds to step 282 to generate a warning flag (i.e., the warning flag field is set to 1). A weather warning/alert is provided to the vehicle occupants when the warning flag field is set to 1.

At step 264, the onboard computer determines whether the current location of the vehicle is in or near the area to which weather warning applies. If so, the onboard computer proceeds to step 266; otherwise, the onboard computer proceeds to step 268. At step 266, the onboard computer checks the warning numbers and matching numbers of (a) the weather warning information and (b) the weather warning mesh. At step 272, the onboard computer determines whether there are any mismatches between the respective warning numbers and matching numbers of (a) the weather warning information and (b) the weather warning mesh. If there are not any mismatches, the method proceeds to step 274; otherwise, the method proceeds to step 282 to generate a warning flag. At step 274, the onboard computer determines whether the warning flag field has been set to 0. If not (i.e., where the warning flag field is set to 1), the method ends at step 290; otherwise, the method proceeds to step 276, where the onboard computer determines whether the blink field is set to 1. If the blink field is set to 1, the onboard computer prompts the display unit to display a blinking icon at step 278. If the blink field is set to 0, the vehicle does not display a blinking icon (step 280). Next, the method proceeds to step 282, where the warning flag field is set to 1, and the method comes to an end at step 290.

Back at step 268, the onboard computer determines whether it is operating in route guidance mode (i.e., whether the vehicle navigation system is providing driving directions to a destination). If so, the computer proceeds to step 270; otherwise, the computer proceeds to step 290 where the method ends. At step 270, the computer determines whether the destination or the route-to-route to destination overlaps with the areas affected by the weather warning. If so, the computer proceeds to step 266; otherwise, the computer proceeds to step 284, where the computer determines if the warning flag field has been set to 1. If the warning flag field has been set to 1, the method proceeds to step 286 where no warning icon is displayed, and then to step 288 where the warning flag field is set to 0. If at step 284, the computer determines that the warning flag field has not been set to 1, the computer proceeds to step 290 where the method ends.

Figure 32:
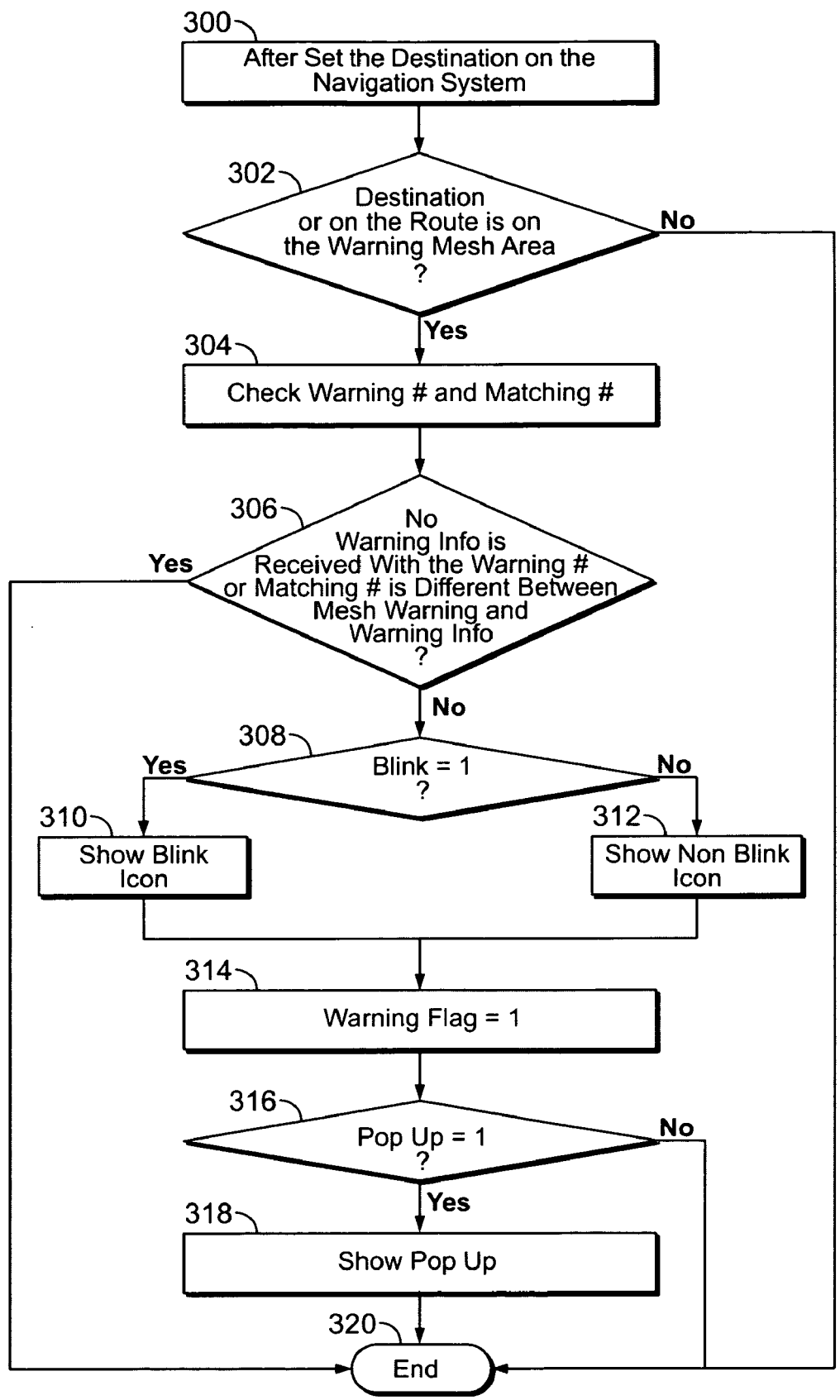
FIG. 32 is a flowchart of the operation of an alternative embodiment of a system for providing weather warnings.

With reference to FIG. 32, there is provided an exemplary method for displaying pop-up messages and/or blinking icons. The method begins at step 300, wherein a destination is entered into the vehicle navigation system. At step 302, the onboard computer determines whether the destination or route to the destination is on the weather warning mesh. If not, the method proceeds to step 320 where the method ends; otherwise, the method proceeds to step 304 where the onboard computer checks the warning and matching numbers of (a) the weather warning information and (b) the weather warning mesh. Next, at step 306 the onboard computer determines whether there are any mismatches in the available warning and matching numbers for the weather data. If so, the method proceeds to step 320 where the method ends; otherwise, the method proceeds to step 308. In one embodiment, auditory warnings are used along with the pop-up messages and/or blinking icons to provide weather warnings or alerts to the user.

At step 308, if the blink field is set to 1, the vehicle shows the weather warning by displaying a blinking icon on the vehicle display screen at step 310; otherwise, a non-blinking icon is provided on the vehicle display screen at step 312. Next, the warning flag field is set to 1 at step 314. Again, weather warnings/alerts are provided to vehicle occupants when the warning flag field is set to 1.

Next, at step 316 if the pop-up field is set to 1, the method proceeds to step 318; otherwise, the method proceeds to step 320 where the method ends. At step 318, the vehicle shows the weather warning by displaying a pop-up weather warning message on the vehicle display screen. Finally, the method proceeds to step 320 where the method ends.

While the present invention has been illustrated and described with particularity in terms of preferred embodiments, it should be understood that no limitation of the scope of the invention is intended thereby. Features of any of the foregoing systems and methods may be substituted or added into the others, as will be apparent to those of skill in the art. It should also be understood that variations of the particular embodiments described herein will occur to those of ordinary skill in the art and yet be within the scope of the present invention.

What is claimed is:

1. A method for receiving weather data at a vehicle, comprising:
   receiving a first broadcast signal at the vehicle, the first broadcast signal containing weather data referenced to a plurality of cells arranged in a grid corresponding to a geographic map, the weather data including one or more assigned warning numbers linking the plurality of cells to at least one weather warning;
   receiving a second broadcast signal at the vehicle, the second broadcast signal containing weather warning information, the weather warning information including the weather warning associated with said one or more assigned warning numbers;
   determining a current location, speed, and direction of the vehicle;
   using the current location, speed, and direction of the vehicle to calculate a future location of the vehicle, the future location of the vehicle being different from the current location of the vehicle;
   correlating the future location of the vehicle to at least one of the plurality of cells;
   identifying a portion of the weather data referenced to said at least one of the plurality of cells;
   filtering the weather data to yield at least filtered data referenced to said at least one of the plurality of cells correlated to the future location of the vehicle; and
   formatting the filtered data for display to vehicle occupants.

2. The method for receiving weather data at a vehicle according to claim 1, wherein correlating the future location of the vehicle to at least one of the plurality of cells further comprises:
   using at least the current location, speed, and direction of the vehicle to calculate a velocity vector; and
   associating the vehicle with one or more of the plurality of cells crossed by the calculated velocity vector of the vehicle.

3. The method for receiving weather data at a vehicle according to claim 1, wherein formatting the filtered data further comprises arranging the weather data within a mesh defined by latitude and longitude.

4. The method for receiving weather data at a vehicle according to claim 1, further comprising removing duplicate data from the received weather data prior to the formatting step.

5. The method for receiving weather data at a vehicle according to claim 1, wherein formatting the filtered data further comprises selecting a blinking icon to indicate the weather warning to the user.

6. The method for receiving weather data at a vehicle according to claim 1, wherein formatting the filtered data further comprises selecting a pop-up message to indicate the weather warning to the user.

7. The method for receiving weather data at a vehicle according to claim 1, further comprising determining if the vehicle is near a warning area defined in the received weather data prior to the formatting step.

8. The method for receiving weather data at a vehicle according to claim 1, wherein receiving at least one of the first broadcast signal and the second broadcast signal comprises receiving a satellite radio broadcast signal.

9. The method for receiving weather data at a vehicle according to claim 1, wherein receiving the first broadcast signal containing weather data comprises receiving the weather data in a mesh/grid format.

10. The method for receiving weather data at a vehicle according to claim 1, wherein receiving the first broadcast signal containing weather data comprises receiving the weather data as a multi-longitudinal data array.

11. A system for receiving weather data at a vehicle, comprising:
    a telematics unit in the vehicle equipped to receive weather data over a broadcast network such that the weather data is referenced to a plurality of cells arranged in a grid corresponding to a geographic map, the weather data including one or more assigned warning numbers linking the plurality of cells to at least one weather warning;
    wherein the telematics unit is further adapted to receive weather warning information over the broadcast network, the weather warning information including the weather warning associated with said one or more assigned warning numbers; and
    a navigation system in electrical communication with the telematics unit for reception of the weather data and further comprising a display equipped to present the weather data to a user, a Global Positioning System antenna equipped to determine the vehicle location, a speed sensor equipped to determine the vehicle speed, and a yaw-rate sensor equipped to determine the vehicle direction;

wherein the navigation system is adapted to calculate a future location of the vehicle using the current location, speed, and direction of the vehicle, the future location being different from the current location, and correlate the calculated future location of the vehicle to at least one of the plurality of cells; and wherein at least one of the telematics unit and the navigation system is adapted to identify a portion of the weather data referenced to said at least one of the plurality of cells and to filter the weather data prior to displaying to the user the weather data referenced to said at least one of the plurality of cells correlated to the future location of the vehicle.

12. The system for receiving weather data at a vehicle according to claim 11, wherein the filtered data is displayed within a mesh defined by latitude and longitude.

13. The system for receiving weather data at a vehicle according to claim 11, wherein the future location of the vehicle is correlated to at least one of the plurality of cells by using at least the current location, speed, and direction of the vehicle to calculate a velocity vector and associating the vehicle with one or more of the plurality of cells crossed by the calculated velocity vector of the vehicle.

14. The system for receiving weather data at a vehicle according to claim 11, wherein the telematics unit further comprises a satellite radio receiver unit equipped to receive the weather data.

15. The system for receiving weather data at a vehicle according to claim 11, wherein the broadcast network comprises a satellite radio broadcasting network.

16. The system for receiving weather data at a vehicle according to claim 11, wherein the navigation system transmits the future location of the vehicle to the telematics unit and the telematics unit filters the weather data.

17. The system for receiving weather data at a vehicle according to claim 11, wherein the navigation system filters the weather data.

18. The system for receiving weather data at a vehicle according to claim 11, wherein duplicate data is removed from the weather data.

19. The system for receiving weather data at a vehicle according to claim 18, wherein the telematics unit removes the duplicate data.

20. The system for receiving weather data at a vehicle according to claim 18, wherein the navigation system removes the duplicate data.

21. The system for receiving weather data at a vehicle according to claim 11, wherein the navigation system requests weather data from the telematics unit based upon the future location of the vehicle.

22. The system for receiving weather data at a vehicle according to claim 11, wherein the display indicates the weather warning via a blinking icon.

23. The system for receiving weather data at a vehicle according to claim 11, wherein the display indicates the weather warning via a pop-up message.

24. The system for receiving weather data at a vehicle according to claim 11, wherein the weather data comprises current weather data.

25. The system for receiving weather data at a vehicle according to claim 11, wherein the weather data comprises weather forecast data.

26. The system for receiving weather data at a vehicle according to claim 11, wherein the weather data comprises weather alerts.

27. The system for receiving weather data at a vehicle according to claim 11, wherein the weather data is displayed as weather icons.

28. The system for receiving weather data at a vehicle according to claim 11, wherein the weather data is displayed as text.

29. The system for receiving weather data at a vehicle according to claim 11, wherein the weather data is displayed via a defined color scheme.

30. A method for providing weather warnings at a vehicle, comprising:

receiving a first broadcast signal containing weather warning mesh data, the weather warning mesh data including a plurality of cells associated with one or more assigned numbers corresponding to at least one weather warning;

receiving a second broadcast signal containing weather warning information, the weather warning information including the weather warning associated with said one or more assigned warning numbers;

linking the weather warning to one or more of the plurality of cells contained in the weather warning mesh data using the assigned warning numbers;

using at least current location, speed, and direction information to calculate a future location of the vehicle;

determining whether the future location of the vehicle is in or near said one or more of the plurality of cells contained in the weather warning mesh data linked to the weather warning; and displaying the weather warning to the vehicle user if the future location of the vehicle is in or near said one or more of the plurality of cells contained in the weather warning mesh data linked to the weather warning.

31. The method for providing weather warnings at a vehicle according to claim 30, wherein displaying the weather warning to the vehicle user further comprises displaying an icon.

32. The method for providing weather warnings at a vehicle according to claim 30, wherein displaying the weather warning to the vehicle user further comprises displaying a blinking icon.

33. The method for providing weather warnings at a vehicle according to claim 30, wherein displaying the weather warning to the vehicle user further comprises displaying a pop-up message.

34. The method for providing weather warnings at a vehicle according to claim 30, wherein the step of linking the weather warning to one or more of the plurality of cells contained in the weather warning mesh data further comprises filtering a portion of the weather warning information that is mismatched to the weather warning mesh data based upon a matching number contained in both the weather warning mesh data and the weather warning information.

35. The method for providing weather warnings at a vehicle according to claim 30, wherein receiving at least one of the first broadcast signal and the second broadcast signal comprises receiving a satellite radio broadcast signal.

* * * * *